(12) United States Patent
Chendamarai Kannan et al.

(10) Patent No.: US 12,088,514 B2
(45) Date of Patent: Sep. 10, 2024

(54) SUB-BAND POSITION MODULATION TECHNIQUES FOR WIRELESS COMMUNICATION

(71) Applicant: QUALCOMM Incorporated, San Diego, CA (US)

(72) Inventors: Arumugam Chendamarai Kannan, San Diego, CA (US); Xiaoxia Zhang, San Diego, CA (US); Sony Akkarakaran, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 367 days.

(21) Appl. No.: 17/387,858

(22) Filed: Jul. 28, 2021

(65) Prior Publication Data
US 2022/0038225 A1  Feb. 3, 2022

Related U.S. Application Data

(60) Provisional application No. 63/059,063, filed on Jul. 30, 2020.

(51) Int. Cl.
*H04L 5/00* (2006.01)
*H04W 72/044* (2023.01)
*H04W 72/0453* (2023.01)

(52) U.S. Cl.
CPC .......... *H04L 5/0007* (2013.01); *H04L 5/0046* (2013.01); *H04W 72/0453* (2013.01); *H04W 72/0473* (2013.01)

(58) Field of Classification Search
CPC ............... H04L 5/0007; H04L 5/0046; H04W 72/0453; H04W 72/0473; H04W 52/34
See application file for complete search history.

(56) References Cited

U.S. PATENT DOCUMENTS 7,660,275 B2    2/2010  Vijayan et al.
2005/0122928 A1*  6/2005  Vijayan ................. H04L 12/189
                                                    370/312

(Continued)

OTHER PUBLICATIONS

Ishikawa N., et al., "50 Years of Permutation, Spatial and Index Modulation: From Classic RF to Visible Light Communications and Data Storage", IEEE Communications Surveys & Tutorials, vol. 20, No. 3, Third Quarter 2018, pp. 1905-1938.

(Continued)

*Primary Examiner* — Ian N Moore
*Assistant Examiner* — Brian T Le
(74) *Attorney, Agent, or Firm* — Shumaker & Sieffert, P.A.

(57) ABSTRACT

Aspects of the disclosure relate to efficiently exchanging data in power-limited wideband communications. A base station and a UE transmit data using sub-band position modulation (SBPM), in which a select subset of frequency sub-bands carry the data transmission. At a given interval of the streamed data portion, a new subset of the sub-bands may be selected as the active sub-bands, thus modulating the active sub-band positions during the data transmission. A receiver monitors for the data transmission signal and detects the sub-bands on/off state in order to receive the data within the active sub-bands. The entities exchange no control information indicating which sub-bands a given transmission uses. Further, SBPM includes pattern recognition by both devices in order to convey additional information each interval by selecting the positions of the active sub-bands to match the pattern associated with the information to be conveyed.

28 Claims, 17 Drawing Sheets

(56) References Cited

U.S. PATENT DOCUMENTS

2010/0034157 A1 2/2010 Stolyar et al.
2019/0174542 A1* 6/2019 Lei ..................... H04W 74/006

OTHER PUBLICATIONS

Mao T., et al., "Novel Index Modulation Techniques: A Survey", IEEE Communications Surveys & Tutorials, vol. 21, No. 1, First Quarter 2019, pp. 315-348.
3GPP TR 38.802: "3rd Generation Partnership Project; Technical Specification Group Radio Access Network; Study on New Radio Access Technology Physical Layer Aspects (Release 14)", 3GPP TR 38.802, V14.2.0 (Sep. 2017), Sep. 2017, 144 Pages.
3GPP TR 38.804: 3rd Generation Partnership Project; Technical Specification Group Radio Access Network; Study on New Radio Access Technology; Radio Interface Protocol Aspects (Release 14); 3GPP TR 38.804, V14.0.0 (Mar. 2017), Mar. 2017, 57 Pages.
International Search Report and Written Opinion issued in corresponding PCT Application No. PCT/US2021/043735, mailed Nov. 16, 2021.

* cited by examiner $N=4, K=2$

N=4, K=2, X=7

SUB-BAND POSITION MODULATION TECHNIQUES FOR WIRELESS COMMUNICATION

PRIORITY CLAIM

This application claims priority to and the benefit of provisional application No. 63/059,063 filed in the United States Patent and Trademark Office on Jul. 30, 2020, the entire content of which is incorporated herein by reference as if fully set forth below in its entirety and for all applicable purposes.

TECHNICAL FIELD

The technology discussed below relates generally to wireless communication systems, and more particularly, to encoding information based on frequency band usage (e.g., a selection of frequency sub-bands on which other information is transmitted). Some aspects may include enabling and providing communication devices configured to leverage availability of a wide bandwidth to carry additional information without using a wider bandwidth for data transmission.

INTRODUCTION

In wireless communication, speed and quality of a data transmission from one endpoint to another is dependent on a number of factors. Frequency bandwidth and frequency range(s) (FRs) made available for the transmission, the bandwidth and FRs actually used for the transmission, and the power that a device can allocate across the bandwidth during the transmission can be factors.

As the demand for mobile broadband access continues to increase, research and development continue to advance wireless communication technologies not only to meet the growing demand for mobile broadband access, but to advance and enhance user experience with mobile communications.

BRIEF SUMMARY OF SOME EXAMPLES

The following presents a simplified summary of one or more aspects of the present disclosure, to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In some cases, a wireless communication device cannot produce or dedicate enough transmission power to effectively use a full allocated bandwidth. Examples of power-limited scenarios for a user equipment include excessive distance from a linked base station, excessive interference, insufficient power supply, and other scenarios when a user equipment (UE) cannot produce enough effective isotropically radiated power (EIRP) to reliably communicate using the full bandwidth.

There are several approaches for maximizing coverage in EIRP-limited scenarios. For example, the data rate across the link can be reduced, so less power is required; this can be accomplished by changing the modulation and coding scheme (MCS), or by slot aggregation as defined in 3GPP technical report (TR) 38.802, V14.2.0 (2017-09), sect. 5.3 and TR 38.804, V14.0.0 (2017-03), sect. 5.4.7, or by transmitting a narrowband instead of a wideband signal. Narrowband solutions include variable bandwidth operation, wherein the base station indicates to the UE a bandwidth part (BWP) with a smaller bandwidth than (e.g., half of the bandwidth of) the full bandwidth. The BWP can be located anywhere within the full bandwidth allocation, but is generally a contiguous frequency range. Another solution is analog or digital beamforming, in which the transmitter controls the antenna elements of the device to operate with a phase difference that controls the direction of the emitted signal; the antenna elements can be controlled to focus the "beam" of energy in a particular direction, specifically, toward the receiving device. With analog beamforming, certain frequency ranges are more utilized than others in New Radio (NR) devices that use certain types of data encoding, such as orthogonal frequency division multiplexing (OFDM).

When power-limited devices adapt (e.g., as described above) to use less than the amount of otherwise available resources, the efficiency of the system may be reduced. The efficiency may be reduced both because fewer resources (e.g., bandwidth) are used to communicate data and because a portion of those reduced resources may be used to communicate information about the adaptation that is occurring. For example, adapting to narrowband transmissions may involve the inclusion of additional control information identifying the frequency band(s) to be used, which in turn adds to the payloads that must be exchanged.

In various aspects, the present disclosure provides features and techniques for wireless communication devices (e.g., transmitting and receiving devices) in a wireless communication system for efficient and robust communications. Some aspects enable, for example, efficient exchange of data (e.g., information, traffic, and/or control) when an allocated frequency bandwidth is wider than devices can efficiently use for quality transmissions, referred to herein as "power-limited scenarios." In some deployments, linked devices (e.g., a base station and a user equipment (UE)) may agree to transmit some or all data using sub-band position modulation (SBPM).

SBPM techniques described herein generally enable encoding or indexing frequency band information implicitly in information transmissions. Practically, these approaches bring about reduced overhead and efficient wireless transmissions. Generally, SBPM involves defining a set of N sub-bands of consecutive frequency ranges that spans the full allocated bandwidth, selecting a subset of K of the sub-bands as "active sub-bands" that can carry a portion of the data transmission, and transmitting the portion of the data to the receiver over the selected active sub-bands. At a given interval or size of the transmitted data portion, a new subset of K of the sub-bands may be selected as the active sub-bands, thus modulating the active sub-band positions during the data transmission.

Disclosed techniques can be used for receive procedures in addition to transmission procedures. In some aspects, a receiver configured to expect SBPM, after establishing a link, monitors for receipt of the data transmission signal and detects the on/off state (i.e., active sub-bands are "on" and others are "off") to receive the data within the active sub-bands. As discussed further below, the receiver may more efficiently process data compared to processing a wideband signal that has its energy distributed across the full bandwidth. The receiver can store N, K, and/or the interval/stream size, so that the receiver may perform "blind" detection of the active sub-bands. According to some techniques, communication entities may exchange no control information indicating which sub-bands are used in a given transmission. This can reduce or eliminate the need for corresponding indicator bits in the payload transmitted over a control channel or within control information transmitted over a shared channel.

According to some aspects, frequency band and/or frequency sub-band usage may vary between states. These may include active or non-active states in some scenarios. Further, since a state of each sub-band may be "on" or "off," the selection of K sub-bands from N possibilities produces $$\binom{N}{K},$$

equivalently notated as (N, K) in this disclosure (i.e., "N choose K," "binomial coefficient," or "combinatorial number") unique patterns or ordered arrangements of on and off sub-bands. For example, if a full bandwidth allocation is divided into N=4 sub-bands, and K=2 sub-bands are active in each interval (e.g., time and/or size), the arrangement of on and off sub-bands will be in one of (4, 2) six possible patterns. SBPM techniques, according to some aspects, can include pattern recognition by both devices to convey additional information for each interval. This additional information may be encoded in a transmission by selecting one or more positions of K active sub-bands to match a pattern associated with the information to be conveyed. These communication techniques enable transmitters to convey to the receiver an additional log 2(N, K) bits of information every interval, without consuming additional transmission resources. Also, these techniques enable receivers to receive data having encoded control information for efficient reception of wirelessly transmitted information.

In one example an apparatus for wireless communication is provided. The apparatus includes a processor, a transceiver communicatively coupled to the processor, and a memory communicatively coupled to the processor. The apparatus is configured to: receive, via the transceiver, a resource allocation indicating a frequency bandwidth, the frequency bandwidth including N frequency sub-bands. The apparatus is further configured to transmit, via the transceiver, a wireless communication over K active sub-bands of the N frequency sub-bands for a first interval. The K active sub-bands of the N frequency sub-bands form an active sub-band position pattern that encodes data.

In another example, a method of wireless communication is provided. The method includes receiving a resource allocation indicating a frequency bandwidth, the frequency bandwidth including N frequency sub-bands. The method further includes transmitting a wireless communication over K active sub-bands of the N frequency sub-bands for a first interval, wherein the K active sub-bands of the N frequency sub-bands form an active sub-band position pattern that encodes data.

In another example, an apparatus for wireless communication is provided. The apparatus includes a processor, a transceiver communicatively coupled to the processor, and a memory communicatively coupled to the processor. The apparatus is configured to: transmit, via the transceiver, a resource allocation indicating a frequency bandwidth, the frequency bandwidth including N frequency sub-bands. The apparatus is further configured to receive, via the transceiver, a wireless communication over K active sub-bands of the N frequency sub-bands for a first interval, wherein the K active sub-bands of the N frequency sub-bands form an active sub-band position pattern that encodes data.

In another example, a method of wireless communication is provided. The method includes transmitting a resource allocation indicating a frequency bandwidth, the frequency bandwidth including N frequency sub-bands. The method further includes receiving a wireless communication over K active sub-bands of the N frequency sub-bands for a first interval, wherein the K active sub-bands of the N frequency sub-bands form an active sub-band position pattern that encodes data.

In another example an apparatus for wireless communication is provided. The apparatus includes a processor, a transceiver communicatively coupled to the processor, and a memory communicatively coupled to the processor. The processor and the memory are configured to: determine a frequency bandwidth for transmission, the frequency bandwidth having N frequency sub-bands; and transmit, via the transceiver, a plurality of transmission clusters to transmit a first data set and a second data set. For each transmission cluster of the plurality of transmission clusters, the processor and the memory are configured to: select K sub-bands as active sub-bands of the N frequency sub-bands, wherein the K active sub-bands are selected to encode a portion of the second data set as an active sub-band position pattern, and transmit, via the transceiver, a portion of the first data set over the K active sub-bands, wherein the transmission over the K active sub-bands indicates the active sub-band position pattern.

In another example, a method of wireless communication is provided. The method includes determining a frequency bandwidth for transmission, the frequency bandwidth having N frequency sub-bands. The method further includes transmitting a plurality of transmission clusters to convey a first data set and a second data set. Transmitting each transmission cluster of the plurality of transmission clusters includes: selecting K sub-bands as active sub-bands of the N frequency sub-bands, wherein the K active sub-bands are selected to encode a portion of the second data set as an active sub-band position pattern. Transmitting each transmission cluster further includes transmitting a portion of the first data set over the K sub-bands, wherein the transmission over the K sub-bands indicates the active sub-band position pattern.

In another example, an apparatus for wireless communication is provided. The apparatus includes a processor, a transceiver communicatively coupled to the processor, and a memory communicatively coupled to the processor. The processor and the memory are configured to: determine a frequency bandwidth for receiving a transmission, the frequency bandwidth having N frequency sub-bands. The processor and the memory are further configured to receive, via the transceiver, a plurality of transmission clusters for conveying a first data set and a second data set. For each transmission cluster of the plurality of transmission clusters, the processor and the memory are configured to: receive, via the transceiver, a data transmission signal including K active sub-bands of the N frequency sub-bands, the K active sub-bands carrying a portion of the first data set; determine an active sub-band position pattern of the K active sub-bands of the N frequency sub-bands; determine a portion of the second data set based on the active sub-band position pattern; and decode the portion of the first data set.

In another example, a method of wireless communication is provided. The method includes determining a frequency bandwidth for receiving a transmission, the frequency bandwidth having N frequency sub-bands. The method further includes receiving a plurality of transmission clusters for conveying a first data set and a second data set. Receiving each transmission cluster of the plurality of transmission clusters includes: receiving a data transmission signal including K active sub-bands of the N frequency sub-bands, the K active sub-bands carrying a portion of the first data set; determining an active sub-band position pattern of the K active sub-bands of the N frequency sub-bands; determining a portion of the second data set based on the active sub-band position pattern; and decoding the portion of the first data set.

These and other aspects of the technology discussed herein will become more fully understood upon a review of the detailed description, which follows. Other aspects, features, and embodiments will become apparent to those of ordinary skill in the art upon reviewing the following description of specific, exemplary embodiments in conjunction with the accompanying figures. While the following description may discuss various advantages and features relative to certain embodiments and figures, all embodiments can include one or more of the advantageous features discussed herein. In other words, while this description may discuss one or more embodiments as having certain advantageous features, one or more of such features may also be used in accordance with the various embodiments discussed herein. In similar fashion, while this description may discuss exemplary embodiments as device, system, or method embodiments, it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, those skilled in the art will readily recognize that these concepts may be practiced without these specific details. In some instances, this description provides well known structures and components in block diagram form in order to avoid obscuring such concepts.

While this description describes aspects and embodiments by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, embodiments and/or uses may come about via integrated chip (IC) embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may span over a spectrum from chip-level or modular components to non-modular, non-chip-level implementations and further to aggregate, distributed, or original equipment manufacturer (OEM) devices or systems incorporating one or more aspects of the disclosed technology. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that the disclosed technology may be practiced in a wide variety of devices, chip-level components, systems, distributed arrangements, aggregated devices, disaggregated arrangements, end-user devices, etc. of varying sizes, shapes, and constitution.

Figure 1:
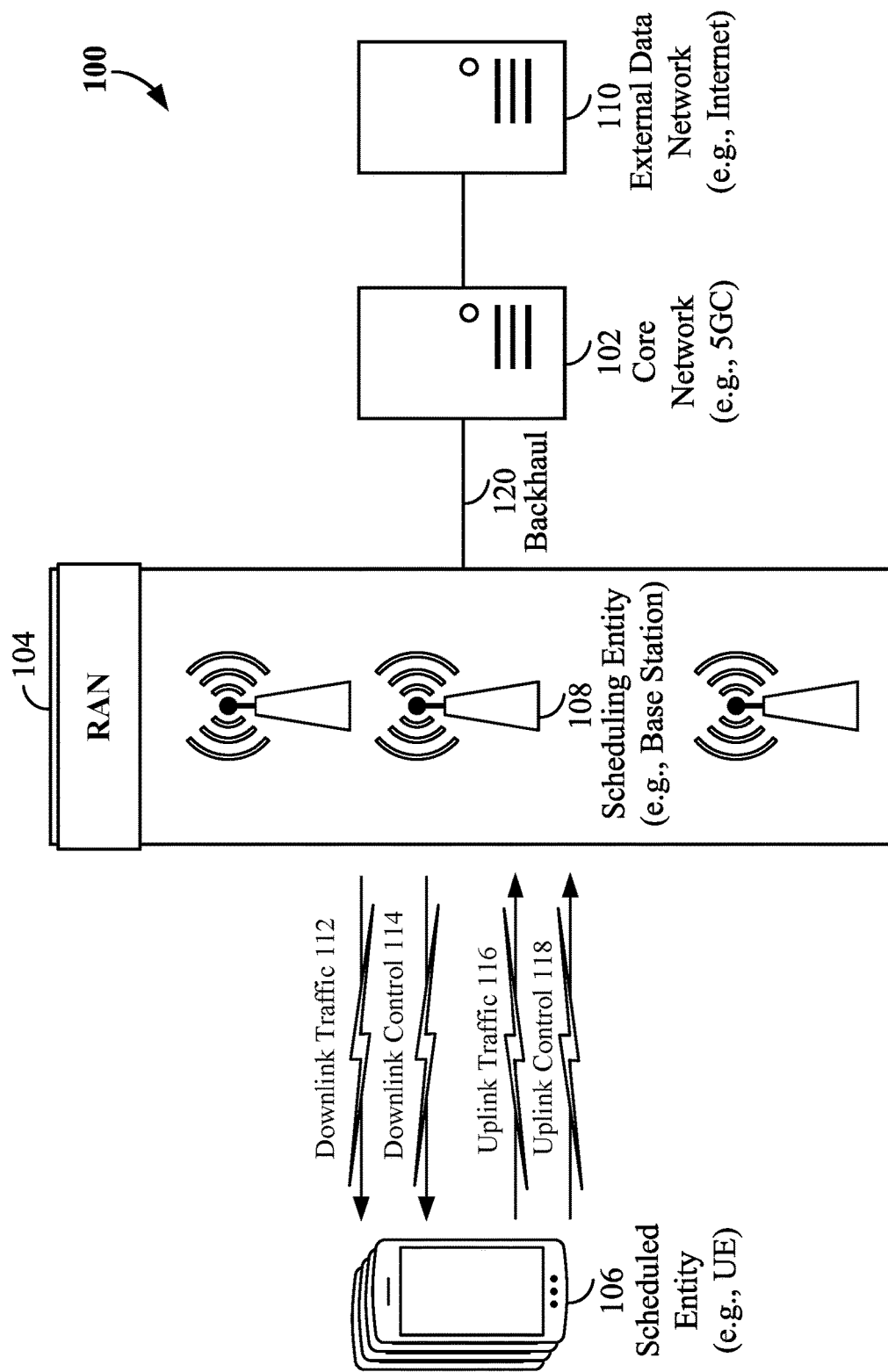
FIG. 1 is a schematic illustration of a wireless communication system according to some aspects.

The disclosure that follows presents various concepts that may be implemented across a broad variety of telecommunication systems, network architectures, and communication standards. Referring now to FIG. 1, as an illustrative example without limitation, this schematic illustration shows various aspects of the present disclosure with reference to a wireless communication system 100. The wireless communication system 100 includes several interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G or 5G NR. In some examples, the RAN 104 may operate under a hybrid of 5G NR and Evolved Universal Terrestrial Radio Access Network (eUTRAN) standards, often referred to as Long-Term Evolution (LTE). 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, those skilled in the art may variously refer to a "base station" as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The RAN 104 supports wireless communication for multiple mobile apparatuses. Those skilled in the art may refer to a mobile apparatus as a UE, as in 3GPP specifications, but may also refer to a UE as a mobile station (MS), a subscriber station, a mobile unit, a subscriber unit, a wireless unit, a remote unit, a mobile device, a wireless device, a wireless communication device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides access to network services. A UE may take on many forms and can include a range of devices.

Within the present document, a "mobile" apparatus (aka a UE) need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled. In some deployments, for example, a scheduling entity (e.g., a base station 108) allocates resources for communication among some or all devices and equipment within its service area or cell. A scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And other devices may perform scheduling operations or aid in facilitating scheduling operations.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

In some examples, the RAN 104 has an open radio access network (O-RAN) architecture. In such examples, the RAN 104 may include (or be disaggregated into) one or more centralized units (CUs), one or more distributed units (DUs), and one or more radio units (RUs) that serve as the scheduling units 108. In other words, the functionality of the respective scheduling units 108 of the RAN 104 are split among one or more a CU, a DU, and an RU. Accordingly, in an O-RAN architecture, the scheduling entity 108 of the RAN 104 may include or refer to one or more of a CU, a DU, and an RU. A CU may be communicatively coupled to the core network 102 via a backhaul (e.g., the backhaul 120) and to one or more DUs via respective midhaul connections. The CU and each DU may collectively perform a substantial portion of the computations of a gNB or base station. In some examples, the CU and DUs may be physically separated from one another. Each DU may be connected to an RU via a fronthaul connection. In some examples, the DU and RU and may be located at a same or nearby location. An RU may transmit and receive radio frequency signals with scheduled entities 106 (e.g., UEs) via an integrated or nearby antenna. For example, an RU may digitize radio signals (e.g., uplink traffic 116 and/or uplink control 118) received via an antenna and provide the digitized signals to an associated DU. Further, the RU may transmit, via the antenna, digital signals received from the associated DU as radio frequency signals (e.g., downlink traffic 112 and/or downlink control 114).

Figure 2:
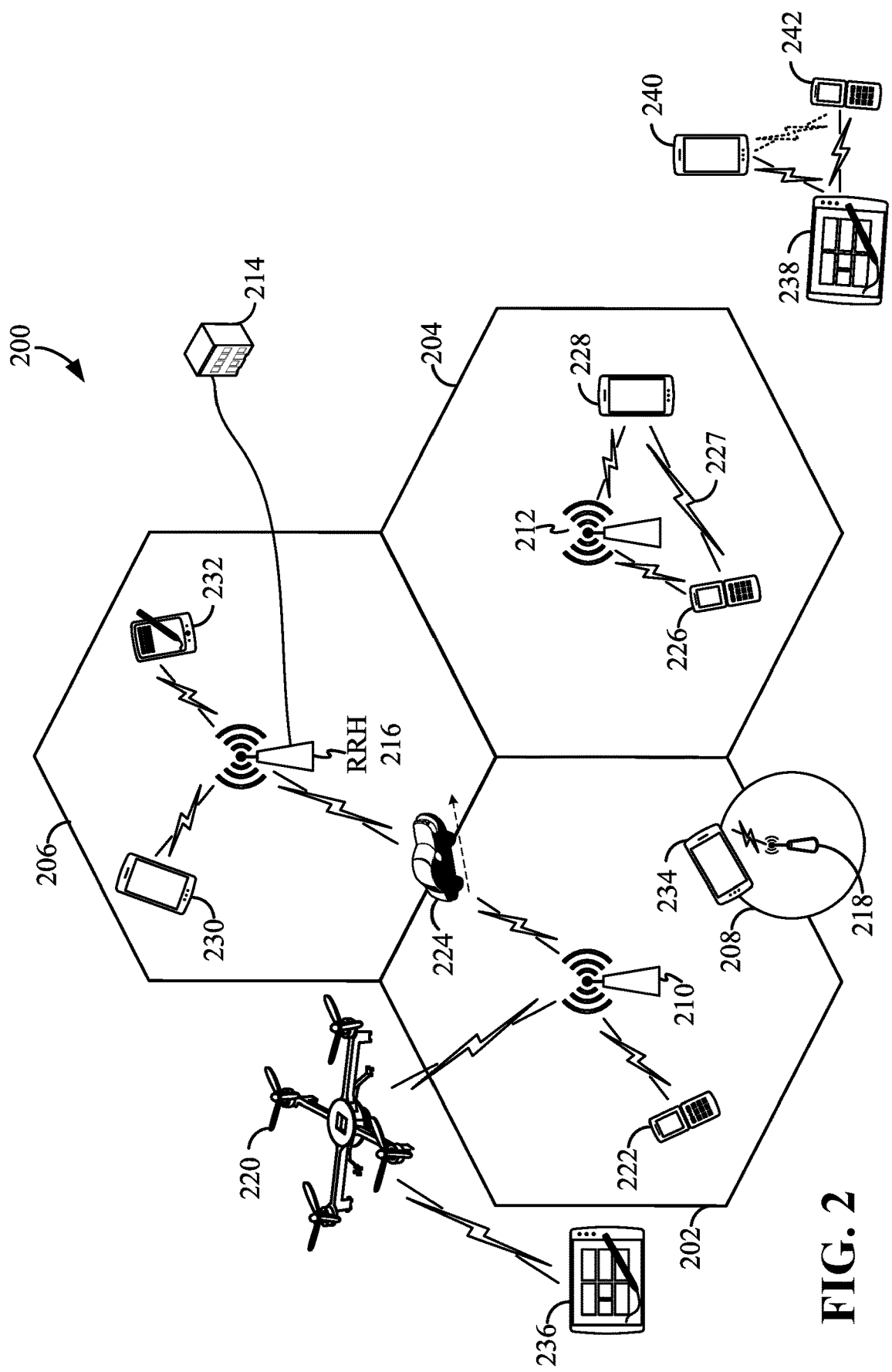
FIG. 2 is a conceptual illustration of an example of a radio access network according to some aspects.

FIG. 2 provides a schematic illustration of a RAN 200, by way of example and without limitation. In some examples, the RAN 200 may be the same as the RAN 104 described above and illustrated in FIG. 1. The geographic area covered by the RAN 200 may be divided into cellular regions (cells) that a user equipment (UE) can uniquely identify based on an identification broadcasted from one access point or base station. FIG. 2 illustrates macrocells 202, 204, and 206, and a small cell 208, each of which may include one or more sectors (not shown). A sector is a sub-area of a cell. All sectors within one cell may be served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

FIG. 2 shows two base stations 210 and 212 in cells 202 and 204; and shows a third base station 214 controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

The RAN 200 may include any number of wireless base stations and cells. Further, a RAN may include a relay node to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes. For example, a UE may provide for UL multiple access utilizing time division multiple access (TDMA), code division multiple access (CDMA), frequency division multiple access (FDMA), sparse code multiple access (SCMA), resource spread multiple access (RSMA), or other suitable multiple access schemes. Further, a base station may multiplex DL transmissions to UEs utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Figure 3:
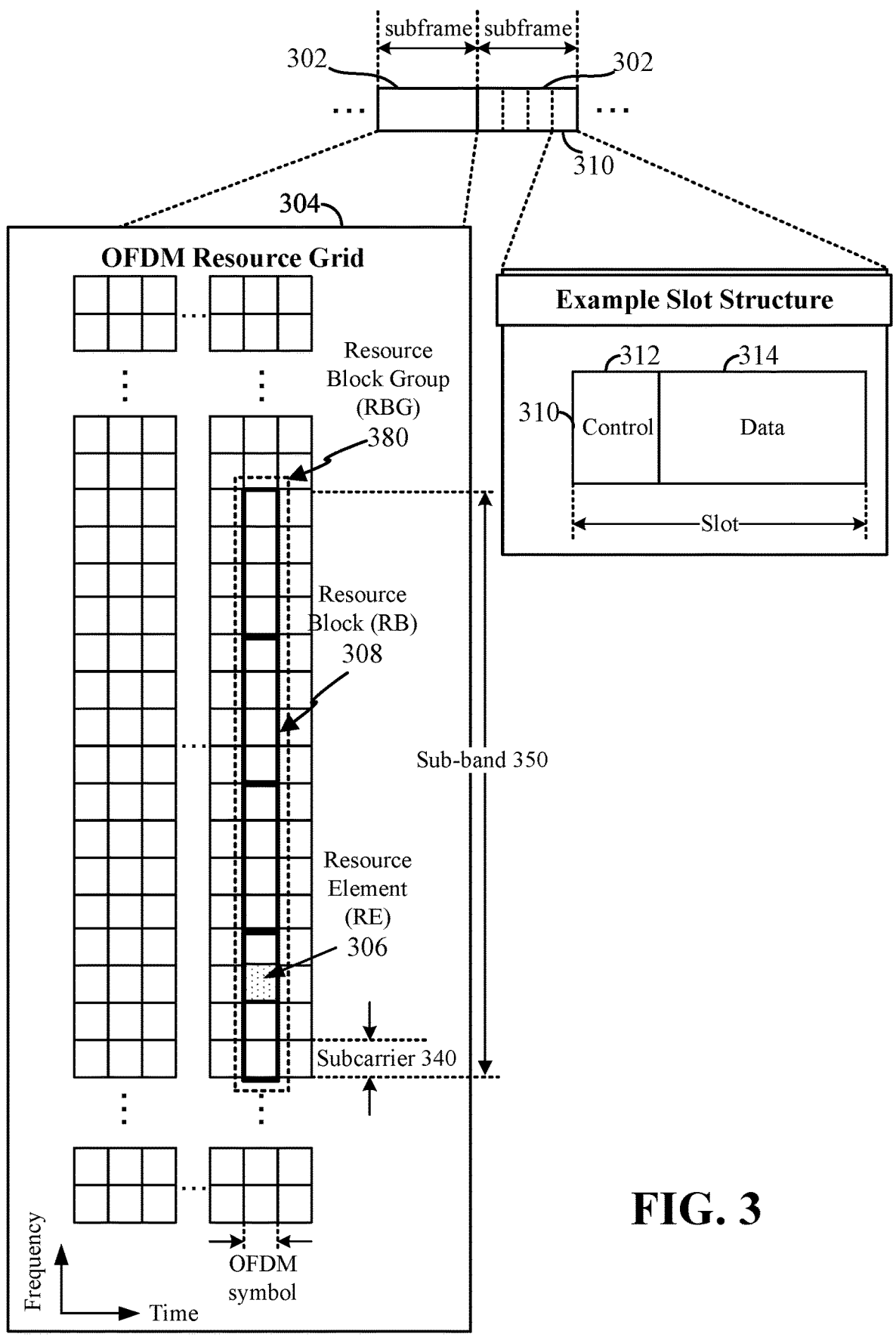
FIG. 3 is a schematic illustration of an organization of wireless resources in an air interface utilizing orthogonal frequency divisional multiplexing (OFDM) according to some aspects.

FIG. 3 schematically illustrates various aspects of the present disclosure with reference to an OFDM waveform. Those of ordinary skill in the art should understand that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms and/or to other frequency division multiplexing waveforms (e.g., FDMA and FDM).

In some examples, a frame may refer to a predetermined duration of time (e.g., 10 ms) for wireless transmissions. And further, each frame may consist of a set of subframes (e.g., 10 subframes of 1 ms each). A given carrier may include one set of frames in the UL, and another set of frames in the DL. FIG. 3 illustrates an expanded view of an exemplary DL subframe 302, showing an OFDM resource grid 304. However, as those skilled in the art will readily appreciate, the PHY transmission structure for any particular application may vary from the example described here, depending on any number of factors. Here, time is illustrated in the horizontal direction with units of OFDM symbols; and frequency is illustrated in the vertical direction with units of subcarriers or tones.

The resource grid 304 may schematically represent time-frequency resources for a given antenna port. That is, in a MIMO implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and may contain a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. The present disclosure assumes, by way of example, that a single RB such as the RB 308 entirely corresponds to a single direction of communication (either transmission or reception for a given device).

A UE generally utilizes only a subset of the resource grid 304. An RB may be the smallest unit of resources that a scheduler can allocate to a UE. Thus, the more RBs scheduled for a UE, and the higher the modulation scheme chosen for the air interface, the higher the data rate for the UE. Additionally or alternatively, a plurality of adjacent or consecutive RBs 308 can be grouped into a resource block group (RBG) 380. An RBG may include any suitable number of RBs 308, and thus the corresponding subcarriers 340 in the RBs 308 as well. Whether the allocation to the UE is measured in subcarriers 340, RBs 308, RBGs 380, or another unit of measure, the total number of subcarriers 340 allocated to the UE for transmission may advantageously be a power of 2 so that the subcarriers 340 and associated REs 306 can be easily addressed in binary form. An RBG 380 may correspondingly contain $2^{\rightarrow}x$ subcarriers 340 so that a certain number N of adjacent/consecutive RBGs 380 of uniform size may span the total allocation of subcarriers 340 without a remainder, as described further below.

In this illustration, the RB 308 and RBG 380 are shown as occupying less than the entire duration (i.e., number and length of symbols) of the subframe 302, although this is merely one possible example. Additionally, the RB 308 and RBG 380 are showing occupying less than the entire bandwidth of the subframe 302, with some subcarriers illustrated above and below the RBG 380. In a given implementation, the subframe 302 may have a bandwidth corresponding to any number of one or more RBs 308. In some examples, an RB 308 or an RBG 380 may correspond to a sub-band 350 of the frequency bandwidth allocated for a data transmission; that is, a sub-band 350 may be defined as the frequency-domain analog of a particular number of consecutive subcarriers 340, and more specifically a sub-band 350 may include the frequency range corresponding to one RBG 380. Furthermore, an RB 308 or an RBG 380 may have a predetermined size equivalent to $2^{\wedge} \times$ subcarriers 340, such as 4 or 8 or 16 subcarriers 340; the number N of RBGs 380 then is $N=S/2^{\rightarrow}x$, where S is the total number of subcarriers 340 allocated to the data transmission (or a specified portion thereof).

It follows that a sub-band 350 that corresponds to such an RBG 380 has a bandwidth of 1/N the frequency bandwidth of the "active wideband" defined by the resource allocation; N consecutive sub-bands 350 of uniform width may span, or define, the bandwidth available to the transmitter for wideband transmission to the receiver. In some examples, one or both of the entities may maintain an index, such as an array with N elements, for identifying a particular sub-band 350 by its sequential position relative to the other sub-bands 350. The index may be a subcarrier index as described below, or a separate index.

In some deployments, each subframe 302 (e.g., a 1 ms subframe) may consist of one or multiple adjacent slots. In FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). A base station may in some cases transmit these mini-slots occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The structure illustrated in FIG. 3 is merely exemplary in nature, and different slot structures may be utilized, and may include one or more of the control region(s) and data region(s).

Although not illustrated in FIG. 3, various REs 306 within an RB 308 may carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In a DL transmission, a transmitting device (e.g., the scheduling entity 108) may allocate one or more REs 306 (e.g., within a control region 312) to carry one or more DL control channels. These DL control channels include DL control information 114 (DCI) that generally carries information originating from higher layers, such as a physical broadcast channel (PBCH), a physical downlink control channel (PDCCH), etc., to one or more scheduled entities 106. In addition, the transmitting device may allocate one or more DL REs to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

A base station may transmit an SS block including synchronization signals PSS and SSS (collectively referred to as SS), and in some examples, the PBCH. The SS block may include four consecutive OFDM symbols. The OFDM symbols may be numbered via a time index in increasing order from 0 to 3. In the frequency domain, the SS block may extend over 240 contiguous subcarriers. The subcarriers may be numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 306 to carry one or more UL control channels, such as a physical uplink control channel (PUCCH), a physical random access channel (PRACH), etc. These UL control channels include UL control information 118 (UCI) that generally carries information originating from higher layers. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein a receiving device can check the integrity of packet transmissions for accuracy, e.g., utilizing any suitable integrity checking mechanism, such as a checksum or a cyclic redundancy check (CRC). If the receiving device confirms the integrity of the transmission, it may transmit an ACK, whereas if not confirmed, it may transmit a NACK. In response to a NACK, the transmitting device may send a HARQ retransmission, which may implement chase combining, incremental redundancy, etc.

In addition to control information, one or more REs 306 (e.g., within the data region 314) may be allocated for other types of data, such as user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. The RAN may provide this system information utilizing minimum system information (MSI), and other system information (OSI). The RAN may periodically broadcast the MSI over the cell to provide the most basic information a UE requires for initial cell access, and for enabling a UE to acquire any OSI that the RAN may broadcast periodically or send on-demand. In some examples, a network may provide MSI over two different downlink channels. For example, the PBCH may carry a master information block (MIB), and the PDSCH may carry a system information block type 1 (SIB1). Here, the MIB may provide a UE with parameters for monitoring a control resource set. The control resource set may thereby provide the UE with scheduling information corresponding to the PDSCH, e.g., a resource location of SIB1. In the art, SIB1 may be referred to as remaining minimum system information (RMSI).

OSI may include any SI that is not broadcast in the MSI. In some examples, the PDSCH may carry a plurality of SIBs, not limited to SIB1, discussed above. Here, the RAN may provide the OSI in these SIBs, e.g., SIB2 and above.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

The air interface in the RAN 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time utilizing a given resource. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

The transmitting entity may modulate a codeword utilizing any suitable modulation scheme, including but not limited to QPSK, 16QAM, 64QAM, 256QAM, etc. The transmitting entity may further utilize "Type 0" or "Type 1" frequency domain resource allocation (FDRA) to schedule resources in a given RBG for transmission. With allocation type 0, a base station may provide a UE with a bitmap having bits that represent an allocation in multiples of resource block groups (RBG). In other words, each bit in the bitmap can inform a UE whether a corresponding RBG is allocated to that UE for DL communication. With allocation Type 1, a base station may provide a UE with a consecutive, contiguous RB allocation by sending to the UE information representing a starting RB, and information representing a number of consecutive RBs. Either allocation type can be used with SBPM, described in the next section.

Dynamic Allocation and "Blind" Detection of Active Sub-Bands with SBPM

In some aspects, the present disclosure provides techniques enabling "sub-band position modulation" (SBPM). Some deployments can include using SBPM for data transmissions in one or both directions between entities in a telecommunications network. Generally, SBPM includes receiving a resource allocation for a transmission spanning a defined frequency bandwidth. In some cases, resource allocation may be greater than a necessary bandwidth for transmission of a given set of data. SBPM may further include dividing a frequency bandwidth into a suitable number N of sub-bands, selecting a suitable number K, less than N, of the sub-bands as "active" sub-bands, and transmitting data using the active sub-bands. Utilizing disclosed techniques, data transmissions may only use a portion of allocated frequency bandwidth enabling other uses for the non-used bandwidth.

Receiver techniques may also leverage disclosed SBPM techniques for improved receive procedures. For example, a receiving entity may be "blind" to which K sub-bands are active (e.g., in scenarios where no active or non-active control information is expressly transmitted). In some deployments, for example, a transmitting entity need not use valuable resources to send the receiver a message, or to include indicators in messages or control information, that identify active sub-bands, as is done in known narrowband transmissions. Instead, receivers may store, receive, and/or determine values of N and/or K, and detect the on/off state of each of the N sub-bands as indicated (e.g., comparing energy received within a sub-band relative to a noise threshold). Encoding on/off (or active/non-active) states via the N and K parameters enables efficient communications.

Transmission techniques may also include additional features in some deployments. For example, a transmitter can modulate a position of active sub-bands within a frequency bandwidth (of a resource allocation) by varying, at a given interval or otherwise on a regular basis, the selection of which sub-bands are the active sub-bands. Thus, a transmitter may establish and/or select a set of unique patterns of on/off states of the N sub-bands, and may use those patterns to represent additional information without necessarily consuming further allocated resources. In some examples, SBPM can release resources that would otherwise be used to encode information corresponding to the data transmission, such as control information, by instead associating the information with one or more of the active sub-band patterns. Both transmitter and receiver can be configured with a pattern-to-information correspondence. In this manner, using (N, K) patterns, SBPM is capable of conveying log $_2$(N, K) bits of additional information every interval of the transmission.

It should be understood that in some cases, the term "RBG position modulation" may be analogous to SBPM. For example, this may occur in scenarios when a full allocation of subcarriers is divided into a set of consecutive (in the frequency domain) RBGs of uniform width and each sub-band corresponds to one of the RBGs.

Figure 4A:
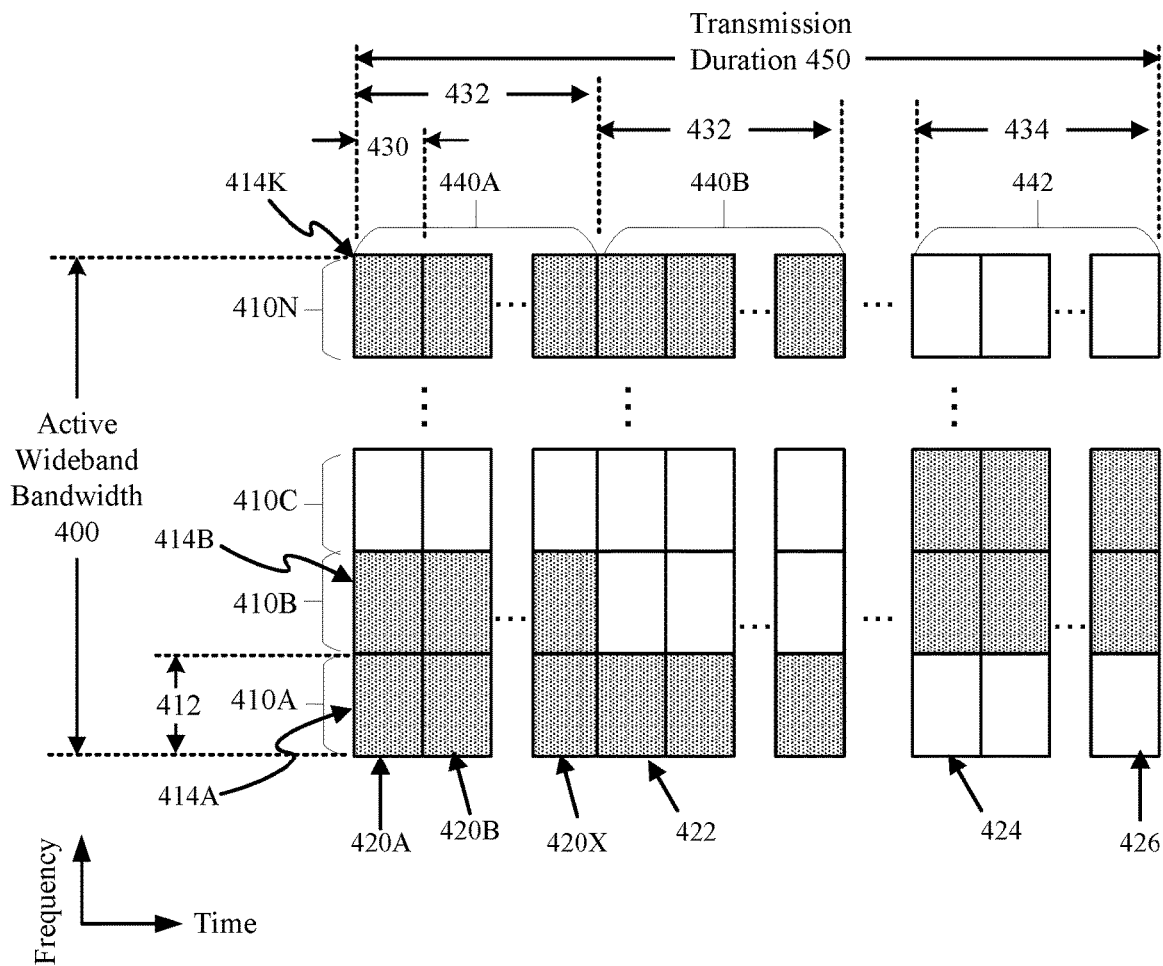
FIG. 4A is a diagram of an example of a narrowband data transmission within an active wideband using sub-band position modulation.

FIG. 4A is a diagram of one example of a SBPM data transmission. As shown, the horizontal dimension represents the time domain containing the duration 450 of a full transmission, and the vertical dimension represents the frequency domain that contains the full bandwidth 400 allocated to a UE for sending and/or receiving a data transmission. The transmission duration 450 is separated into time units 430 of known or determinable duration. A time unit 430 may be an exact length of time, such as 1 ms, or the time unit 430 may be the duration of an OFDM symbol or a similar symbol that is a discrete unit. In some scenarios, the discrete unit may have a varying, but known, duration based on the value of the symbol. The allocated bandwidth 400 is separated into N sub-bands 410A, 410B, 410C, . . . , 410N, each of a known or determinable bandwidth 412. A bandwidth 412 may be uniform across all sub-bands 410A-N, or the bandwidth 412 may vary between various sub-bands 410A-N provided the bandwidth 412 of each sub-band 410A-N is known to the transmitter and the receiver. The data being transmitted may include any type and size of data typically sent via uplink or downlink transmission. As will be understood from the following descriptions, some of the transmissions that can be more efficiently transmitted in power-limited scenarios by using SBPM may include, without limitation, PDCCH and PUCCH transmissions, transmissions of DCI or UCI, transmissions of control and other information from or to a UE operating with an autonomous uplink to one or more base stations.

A transmitter may transmit data in a signal that the transmitter distributes among a subset of the sub-bands 410A-N. This subset can contain K "active" sub-bands 414A, 414B, . . . , 414K. The value K may be a fixed number less than or equal to N, and stored or otherwise known by both the transmitter and the receiver. Or, the value of K may be variable; for example, the transmitter may select K from a finite set of possible values, and may even vary the selected value of K during the data transmission. The transmission may include sufficient information to enable the receiver to determine the value of K, particularly if the value is variable, and to confirm that K of the sub-bands have been correctly identified as "on" in order to receive the transmission. The receiver may use any suitable detection methodology to determine that a data signal is being received on the active sub-bands 414A-K. A receiver may also determine that data is not present on remaining N-K sub-bands. Several non-limiting example methodologies are described below with respect to the figures.

In SBPM, the transmitter may "modulate" the active sub-band 414A-K positions. This can producing an additional modulated data signal by changing which of the sub-bands 410A-N are active during the data transmission. The selection of active sub-bands may be changed or permuted at a given interval with a suitable duration 432 that is known to the receiver. In this manner, the transmitter may encode a portion of the data into a data stream; the portion (i.e., size) of the data may be selected so that it takes the duration 432 of an interval for the receiver to receive the corresponding data stream. Thus, in an example as illustrated, the time units 430 may correspond to OFDM symbols, and the data may be encoded into a stream of OFDM symbols; each time a "cluster" 440A, 440B of X sequential OFDM symbols 420A, 420B, . . . , 420X is transmitted, the transmitter may change the selection of active sub-bands 414A-K.

Transmissions may also include one or more data clusters. Clusters may generally represent portions (or varying sizes) of wireless transmissions (data or otherwise). The illustrated example shows a first cluster 440A of OFDM symbols 420A-X. In the first cluster 440A, the selected set of active sub-bands 414A-K include sub-bands 410A, 410B, and 410N. A sequential second cluster 440B of OFDM symbols following the first cluster 440A includes another set of active sub-bands 414A-K that includes sub-bands 410A and 410N but not sub-band 410B. The transmitter continues to encode and then stream the data to the receiver, until it sends a final cluster 442 including the last OFDM symbol 426 in the data transmission. This final cluster may have a duration 434 of fewer than X symbols. The receiver may detect the first OFDM symbol 420A of the first cluster 440A, initiating the receiver's processing of the data stream. While, or after, receiving the data transmission, the receiver may begin to demodulate the OFDM symbols of the data stream, and can then determine the information represented by the OFDM symbol 422 at the beginning of the second cluster 440B, and so on until it identifies the first OFDM symbol 424 and last OFDM symbol 426 of the final cluster 442.

In identifying clusters, a receiver may determine on/off states of sub-bands 410A-N and identify a pattern of the on/off states corresponding to transmission of the data stream during each cluster. Referring to a transmission illustrated in FIG. 4B, the pattern is one of a finite set of unique patterns, the number of which may be determined by how many sub-bands 452A, 452B, 452C, 452D make up the full frequency bandwidth 400, and how many of the sub-bands 452A-D are active (i.e., N and K). Since there are a finite number of patterns, in recognizing the actual pattern the receiver will have received a certain amount of information. The number of possible unique patterns or ordered arrangements given N and K (e.g., the number of permutations or partial permutations of K sub-bands selected from the set of N sub-bands of the resource allocation) is known as the "binomial coefficient" or "combination number" or "N choose K," and is provided by the equation $(N, K)=N!/((K!(N-K)!)$. N may be any number less than or equal to the total number of allocated sub-bands, and K may be any number less than or equal to N. The pattern is binary, since the only possible states are "on" and "off;" so, the amount of information that can be conveyed by recognizing the pattern is equivalent to $\log_2(N, K)$ bits. K may be selected to maximize the number of unique patterns of "active" and not "active" (i.e., "on" and "off") sub-bands 412A-N; when N is a power of 2, K=N/2 provides the largest number of combinations. For example: (4, 2)=6, as shown in the Figure; (16, 8)=12,870; and, (64, 32)=$1.833 \times 10^{18}$.

Figure 4B:
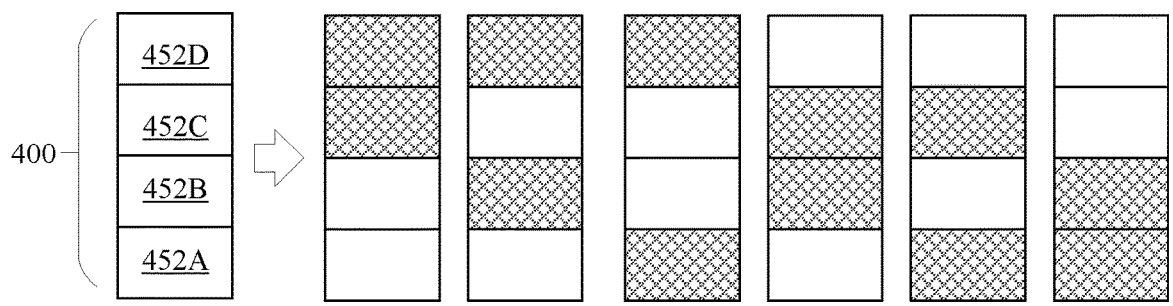
FIG. 4B is a diagram of another example of a narrowband data transmission within an active wideband using sub-band position modulation.
Figure 5:
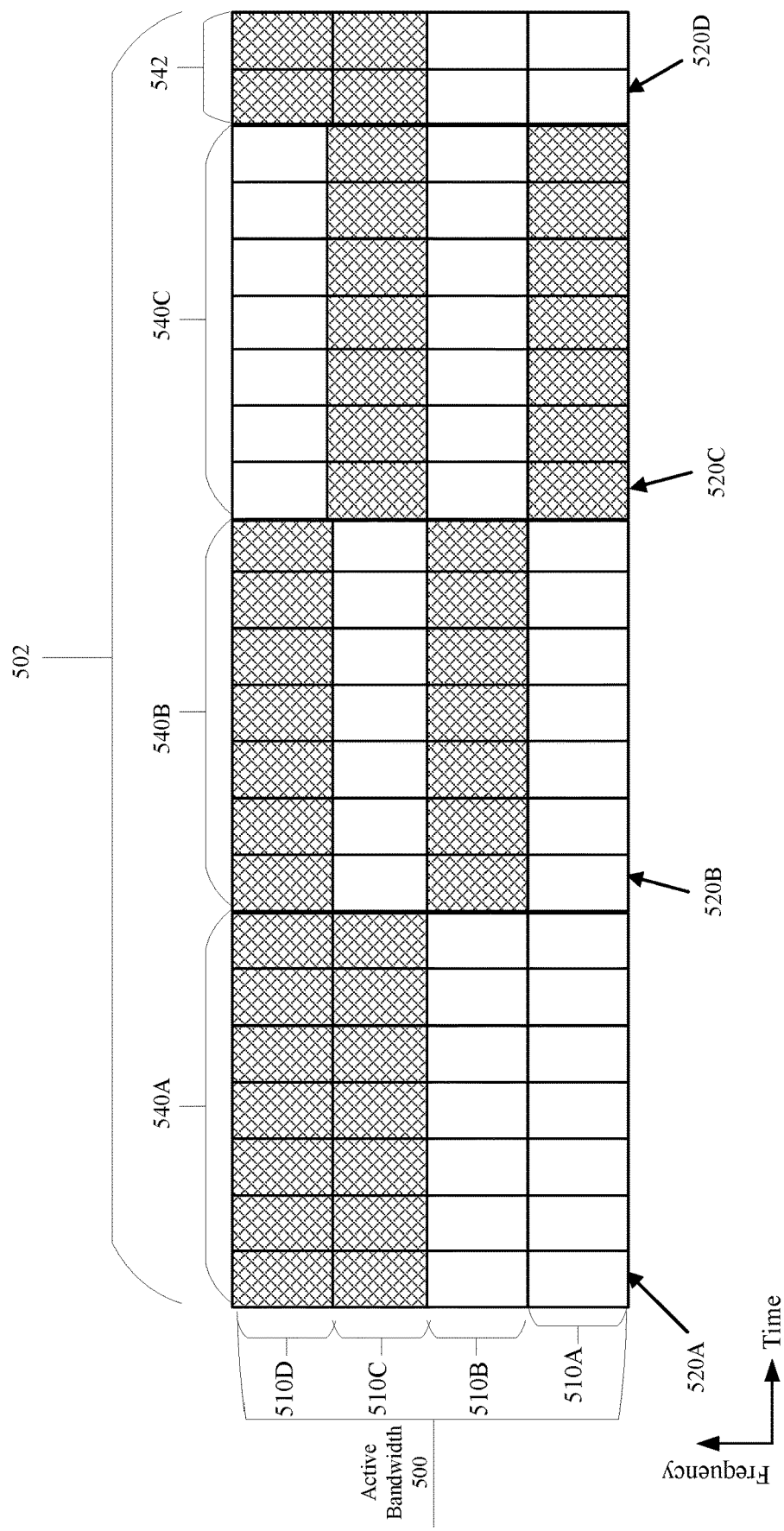
FIG. 5 is a diagram of yet another example of a narrowband data transmission within an active wideband using sub-band position modulation.

FIG. 5 illustrates the example transmission of FIG. 4B in an example time domain that is measured in OFDM symbols. In FIG. 5, the data transmission has a duration 502 that includes three clusters 540A, 540B, 540C of length X, where X=7 OFDM symbols. The duration 502 further includes a final cluster 542 of length 2 OFDM symbols. The bandwidth 500 of the resource allocation is again broken down into N=4 sub-bands 510A, 510B, 510C, 510D, and K=2 sub-bands 510A-D are active for each cluster 540A-C, 542. At a first time (i.e., t=0), the receiver may detect a first OFDM symbol 520A of the first cluster 540A. The receiver may further process the data transmission, determining that the first cluster 540A has a first pattern in which the sub-bands at positions 510C and 510D are active. After seven OFDM symbols are received, the receiver detects the first symbol 520B of the second cluster 540B, which has a second pattern in which the sub-bands at positions 510B and 510D are active. A first symbol 520C of the third cluster 540C indicates the sub-bands at positions 510A and 510C are active (third pattern). Finally, a first symbol 520D of the final cluster 542 is detected at sub-band positions 510C and 510D, which is the first pattern again. Thus, unique information corresponding to the first, second, third, and then first patterns is conveyed using SBPM.

Figure 6:
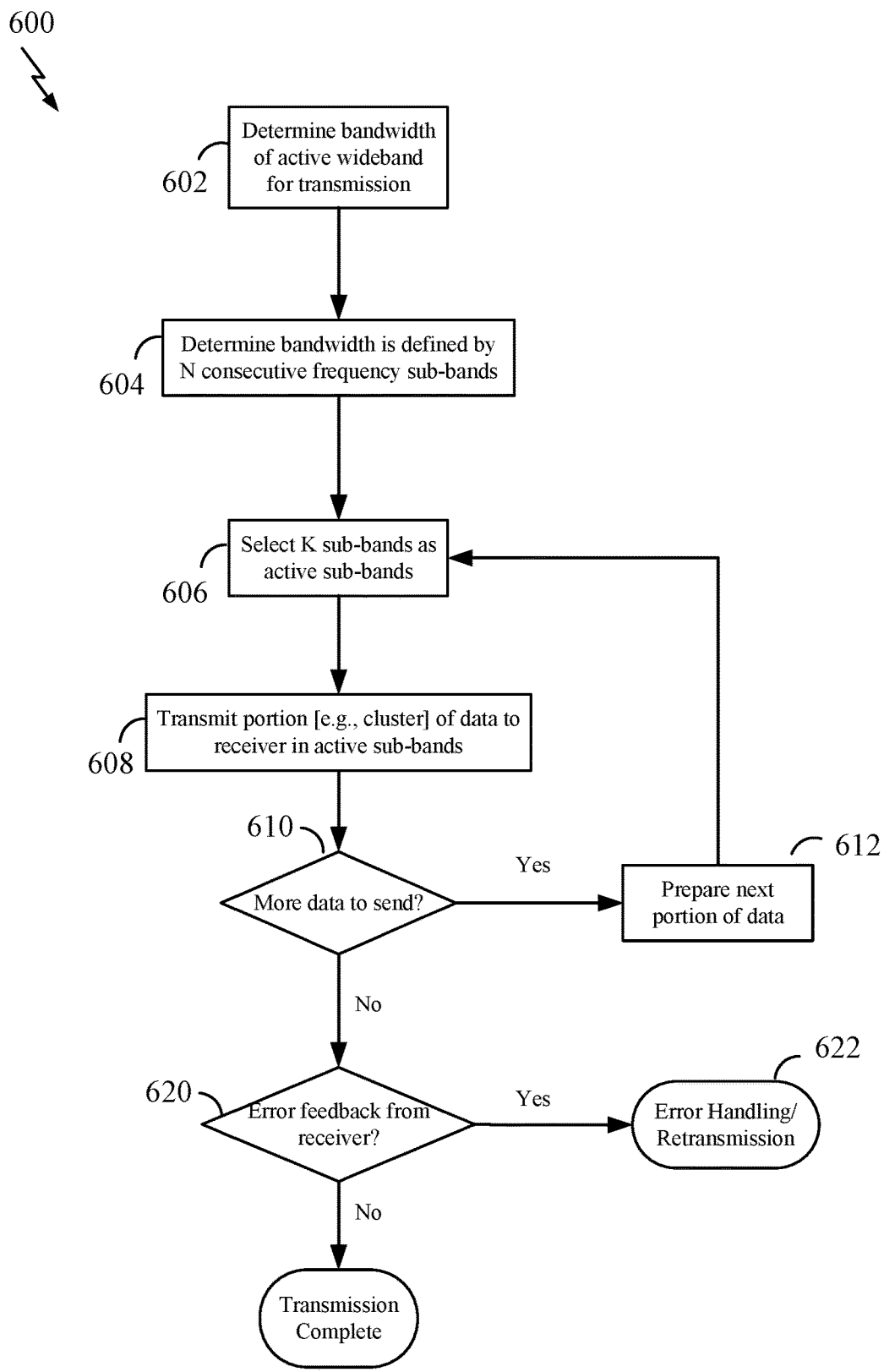
FIG. 6 is a flowchart of an example method of encoding and transmitting data using sub-band position modulation according to some aspects.

FIG. 6 illustrates an example method 600 that a transmitting entity (e.g., transmitter 1200 of FIG. 12) may perform to encode data and transmit it using SBPM. At 602, the transmitter may determine a resource allocation for a transmission of data over a network to a receiver, and from the allocation may determine a frequency bandwidth associated with the resource allocation. At 604, the transmitter may determine that the full frequency bandwidth can be defined by N consecutive sub-bands, which may be of uniform width. Blocks 606-612 may be performed repeatedly, at an interval having a suitable duration, until the data is transmitted. At 606, the transmitter may select K of the sub-bands as active sub-bands, such as by determining a corresponding position, of N positions within the frequency bandwidth, of each of the active sub-bands. At 608, using the corresponding positions, the transmitter may transmit a portion of the data to the receiver within the K active sub-bands. At 610, the transmitter may determine whether there is more data to send, and if so, at 612 the transmitter may prepare the next portion of data to send.

Once the data is sent, at 620 the transmitter may determine whether any feedback information from the receiver indicates one or more transmission errors. If so, the transmitter may at 622 enter into one or more corresponding error handling routines, including identification and retransmission of portions of the data and other error handling.

Figure 7:
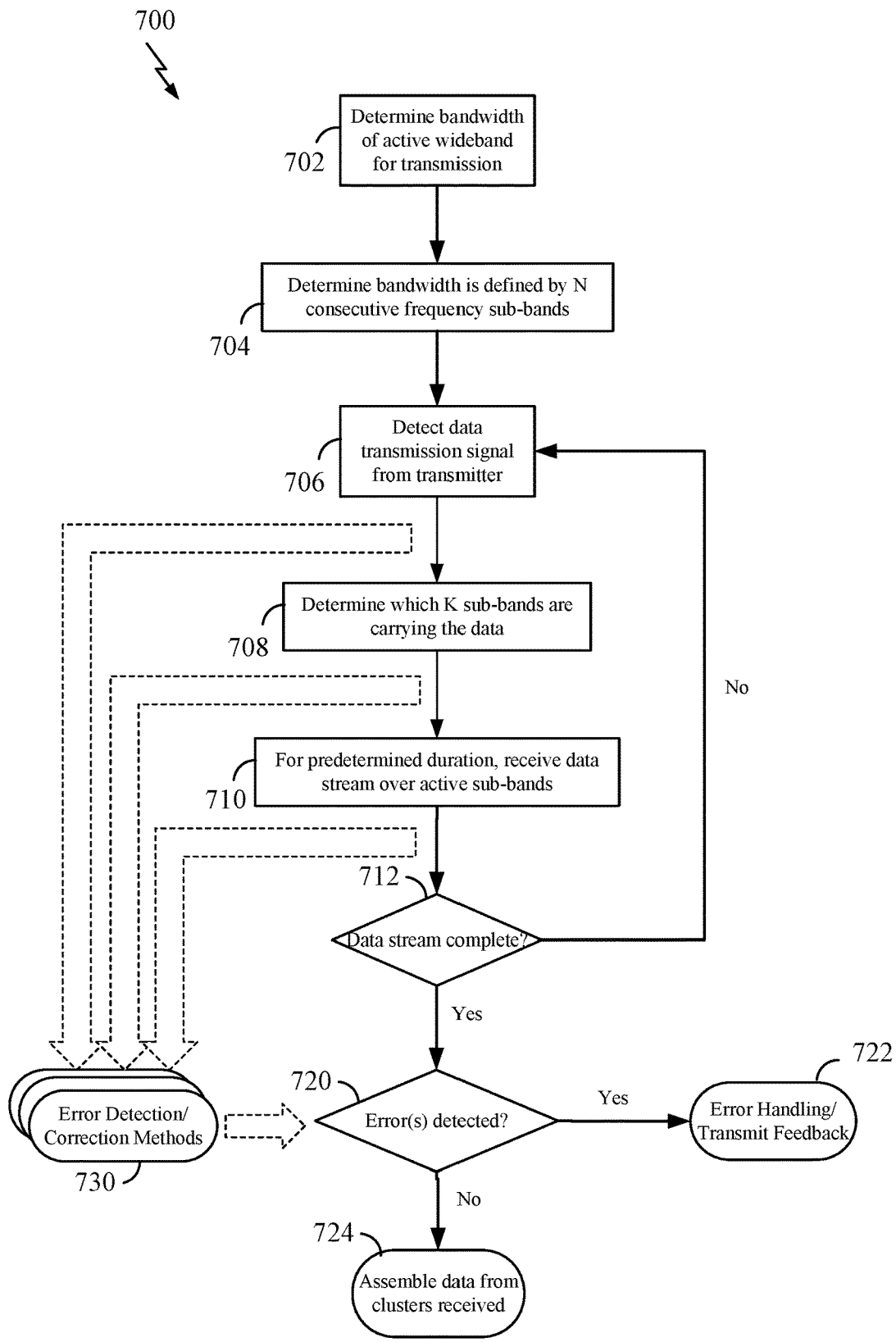
FIG. 7 is a flowchart of an example method of receiving and decoding data transmitted using sub-band position modulation according to some aspects.

FIG. 7 illustrates an example method 700 performed by a receiving entity (e.g., a UE, a base station, and/or receiver 1300 of FIG. 13) to receive and decode data transmitted using SBPM. At 702, the receiver may determine a resource allocation for a transmission of data over a network from a transmitter, and from the allocation may determine a frequency bandwidth associated with the resource allocation. At 704, the receiver may determine that the full frequency bandwidth can be defined by N consecutive sub-bands, which may be of uniform width. In some examples, the receiver may perform blocks 706-712 repeatedly until the data is completely received. For example, at 706, the receiver may detect a first signal initiating a transmission of data over a network and within the available bandwidth, such as by sampling a transmission energy spread across the N sub-bands to detect a corresponding signal within K of the sub-bands. At 708, the receiver may identify K active sub-bands that are carrying the data. At 710, the receiver may receive, for the corresponding duration, within the K active sub-bands, a data stream encoding a corresponding portion of a plurality of portions of the data. And, at 712, the receiver may determine whether the transmission is complete, and return to 706 if not.

At several steps of the method 700, the receiver may detect an error or potential error in the transmission and divert processing to one or more error detection and/or error correction methods (block 730). For example, the receiver may decode one or more of the received data streams and then generate a CRC or other integrity check. The results may indicate that the receiver did not accurately identify the active sub-bands, or did not receive all the data, or received corrupted data, etc. At 720 the receiver may determine whether an error in the transmission was detected. If so, at 722 the receiver may proceed to transmit feedback to the transmitter (e.g., using SBPM) or perform other error handing. If the receiver received and correctly decoded the data streams, at 724 the receiver may assemble the data portions back into the original data.

Figure 8:
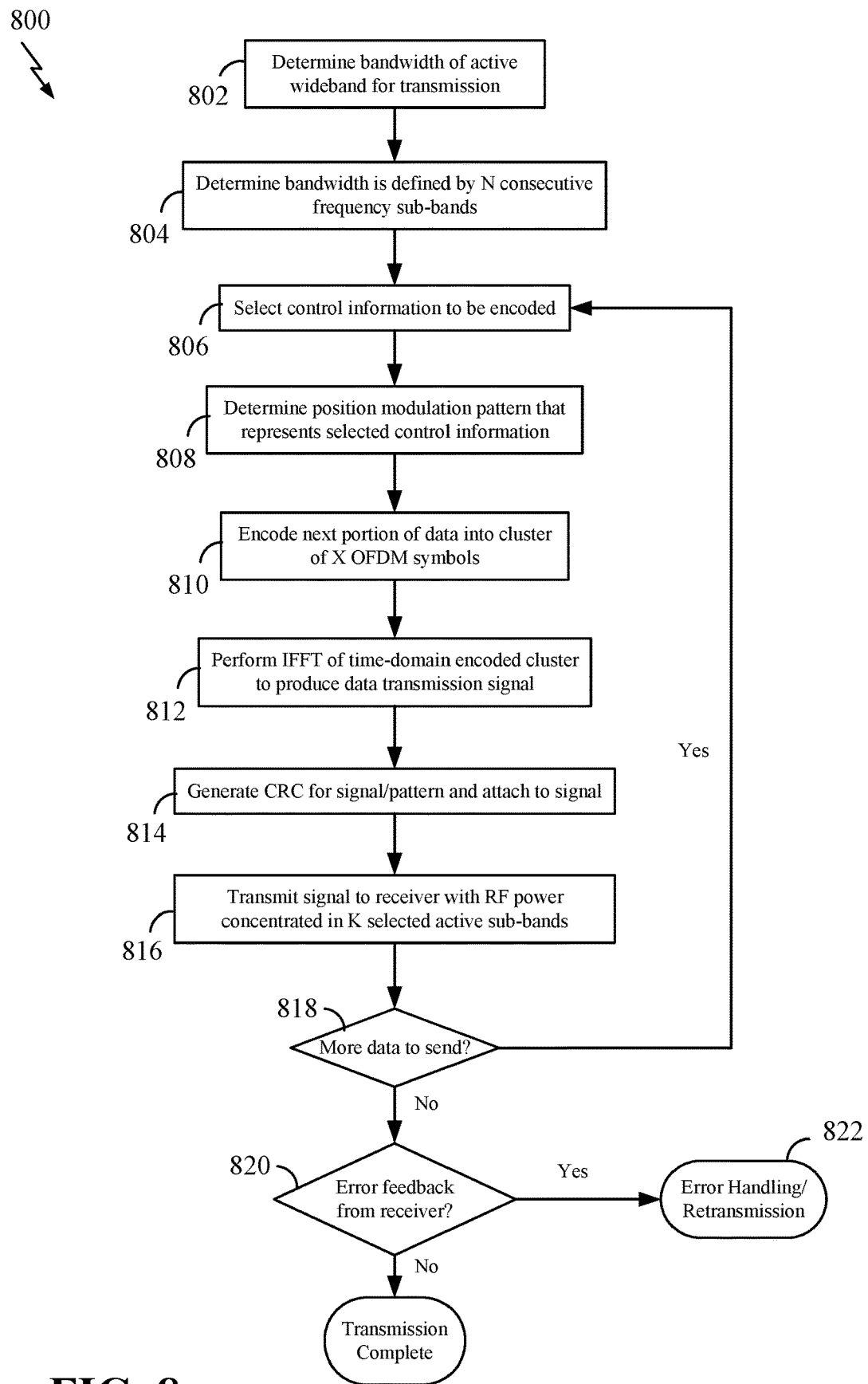
FIG. 8 is a flowchart of another example method of encoding and transmitting data using sub-band position modulation according to some aspects.

FIG. 8 provides a further example method 800 for transmitting data, which a transmitting entity (e.g., a UE, a base station, and/or transmitter 1200 of FIG. 12) may perform using OFDM and SBPM encoding. As previously explained, at 802 and 804, the transmitter may determine a resource allocation and associated frequency bandwidth for active wideband transmission, and may determine N sub-bands defining the frequency bandwidth in the resource allocation. Then, the transmitter may repeatedly perform 806-818 until all clusters of data are sent. For example, at 806, the transmitter may select information, such as control information, that can be sent by SBPM pattern recognition. At 808, the transmitter may determine which of the position modulation patterns represents the information to convey. At 810, the transmitter may encode the next portion of data that can be represented in the K active sub-bands over X OFDM symbols, to produce the next cluster of data. At 812, the transmitter may apply an inverse fast Fourier transform (IFFT) to the cluster to produce the data transmission signal in the time domain. At 814, the transmitter may generate a CRC from the data transmission signal (this can instead be done to the OFDM cluster, or to the portion of data itself) and/or from the selected pattern, and attach the CRC(s) to the data transmission signal. At 816, the transmitter may transmit the generated signal to the receiver within the K active sub-bands, which allows the transmitter to concentrate available transmitter power and antenna gain into the active sub-bands; and, at 818, determine whether there is more data to send and return to 806 if so. Once all data is sent for this particular transmission, at 820 the transmitter may determine whether it received error feedback from the receiver. The transmitter may then, at 822, perform any suitable error handling and retransmission as described above.

Figure 9:
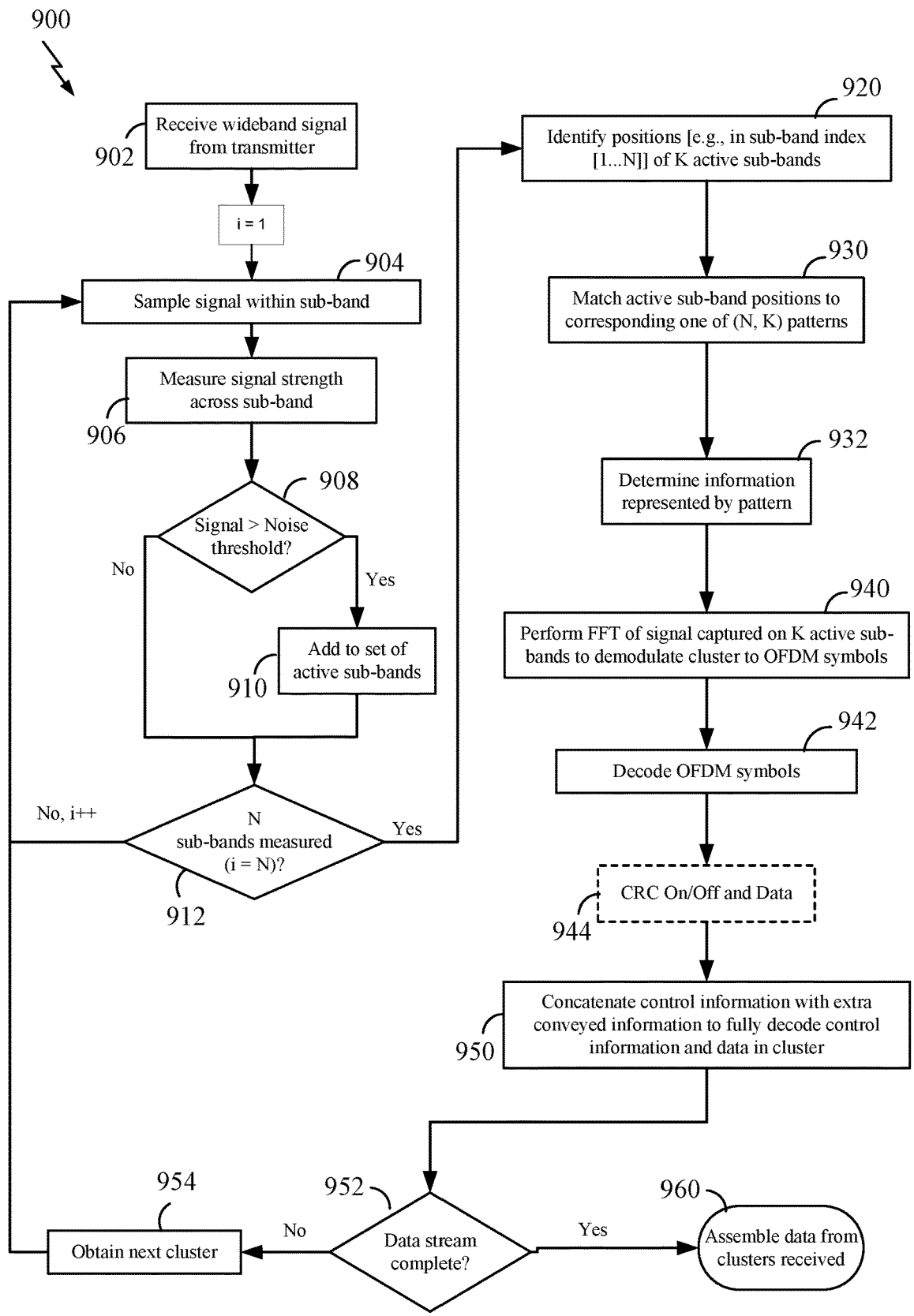
FIG. 9 is a flowchart of another example method of receiving and decoding data transmitted using sub-band position modulation according to some aspects.

FIG. 9 provides a further example method 900 for receiving data, which a receiving entity (e.g., a UE, a base station, and/or receiving entity 1300 of FIG. 13) may perform using OFDM and SBPM encoding. For example, a receiver may perform the method 900 on the data transmission produced by method 800 of FIG. 8. As previously explained, at 902 the receiver may receive a data transmission signal from the transmitter. The receiver may assume this signal to be wideband when the receiver is aware of the resource allocation, because the typical control information that identifies a subset of frequencies (e.g., a narrowband and/or variable bandwidth transmission) within the resource allocation has not been sent or received. The receiver may then perform initial on/off detection of the N sub-bands, based for example on receipt of the signal representing the first symbol in the first cluster of the data transmission.

In various examples, on/off detection may include a loop of steps 904-912 performed in series, in parallel, or in a combination of series and parallel, on each sub-band. For example, at 904, the receiver may obtain one or more samples of the signal within the sub-band. At 906, the receiver may analyze the samples to determine the signal strength in the sub-band, such as by determining an average signal strength for all samples, or a peak signal strength among the samples, etc. At 908, the receiver may compare the measured signal strength to a reference signal representing the noise floor or another baseline measurement, and determine whether the measured signal strength exceeds the reference signal by a threshold amount indicating that the signal is likely present within the sub-band. If not, the receiver may proceed to 912. If the measured signal does exceed the threshold, at 910, the receiver may add the sub-band to the set of active sub-bands (i.e., the sub-bands with a measured signal strength indicating the sub-band is "on"). At 912, if not all the sub-bands have been measured, the receiver may return to block 904; but, if the receiver has measured all N sub-bands, the receiver has determined the set of K active sub-bands and can proceed. It should be noted that if the receiver has measured the energy on all N sub-bands and the set of active sub-bands does not include K sub-bands, the receiver may re-measure the energy and/or generate error feedback and send it to the transmitter.

At 920, the receiver may identify a corresponding position of each of the active sub-bands. For example, the receiver may maintain an index of the sub-bands, such as an array containing N elements or a hexadecimal number representing N binary bits. Here, identifying the position may include setting the element/bit corresponding to the position of each active sub-band to a value of "on" or 1, and setting all other elements/bits to "off" or 0. At 930, the receiver may match the identified positions of the active sub-bands to a corresponding pattern in the set of unique position modulation patterns to determine which pattern was used. For example, the receiver may store in memory (e.g., memory 1405) a set of (N, K) patterns as arrays of binary elements, or hexadecimal numbers, or the like. Here, the receiver may use any suitable binary search algorithm to compare the detected set of positions to the patterns. At 932, the receiver may determine the information that is represented by the pattern and thus conveyed by SBPM for the present cluster. For example, the receiver may store data associating each unique pattern with a unique set of information elements, such as in a lookup table or database record(s) (e.g., in memory 1405). Additionally or alternatively, the information itself may be a logic determination. For example, the active sub-bands may be arranged in a certain pattern and not the other possible patterns. This technique can convey as much information as can be represented by $\log_2(N, K)$ binary bits.

The receiver may then proceed to decode the received information using any suitable methodology. In the illustrated example, the transmission may be encoded in OFDM symbols and modulated using 16QAM. So, at 940, the receiver may perform an FFT of the received signal in a given OFDM symbol to demultiplex each received data stream into its corresponding set of resource elements (REs), and further, demodulate the symbols in the REs by generating a hypothesis as to the set of bits each respective symbol represents. At 942, the receiver may decode the demodulated data to produce the originally encoded portion of the data. At 944, the receiver may identify a CRC value in the data portion, and may generate a corresponding CRC from the data portion and check for a match, validating the data. At 950, the receiver may finish decoding the cluster of data by combining the "additional bits" of information conveyed by the active sub-band pattern with the rest of the data (e.g., into the control information). For example, the receiver may concatenate the extra conveyed bits onto the rest of the data. At 952, the receiver may determine whether all of the data transmission has been received. If not, at 954 the receiver may obtain the next cluster from the buffered transmission and then return to 904 to analyze it. If the data stream is complete, at 960 the receiver may assemble the correctly decoded data portions into the original data that was transmitted.

Figure 10:
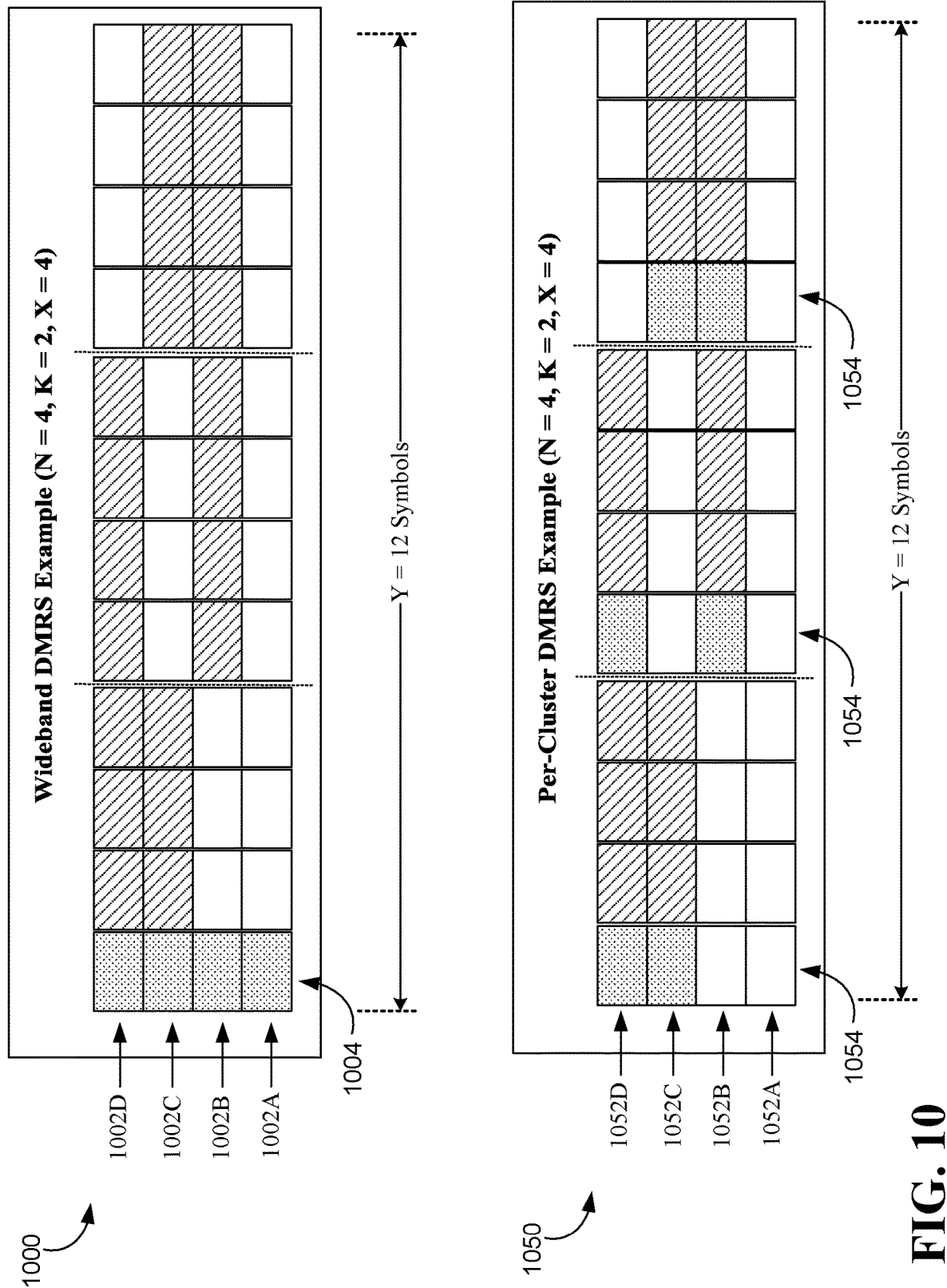
FIG. 10 is a diagram comparatively illustrating example implementations of encoding a demodulation reference signal in sub-band position modulated transmissions according to some aspects.

FIG. 10 provides a visual comparison of two different approaches to using demodulation reference signals (DM-RSs) or other suitable reference signal in an SBPM transmission. Again, the horizontal dimension is measured in OFDM symbols and the vertical dimension is measured in sub-bands. In the top, "wideband" example 1000, having N=4 sub-bands 1002A-D and K=2 active bands, a DM-RS 1004 may be transmitted at a regular interval of Y OFDM symbols (i.e., Y=12 symbols in the illustrated example), irrespective of the duration of the clusters (i.e., X=4 symbols in the illustrated example) in the transmission. In the wideband approach, the DM-RS 1004 is transmitted in wideband manner (i.e., over each of the N sub-bands 1002A-D) in the first illustrated symbol, effectively preventing conveyance of data via SBPM during that particular symbol. In other words, because all sub-bands 1002A-D are active, a SBPM pattern cannot be conveyed through selection of particular sub-bands for data transmission while the wideband DM-RS is being transmitted.

In a bottom, "per-cluster" example 1050, having N=4 sub-bands 1052A-D and K=2 active bands, a DM-RS 1054 is transmitted within the first symbol of every cluster, on the active sub-bands in the cluster. Because the DM-RS 1054 is transmitted on the active sub-bands for each cluster, a transmitting device can convey data via SBPM during the symbols having the DM-RS 1054 (in contrast to the wideband example 1000). However, the tradeoff is that the DM-RS is sent more often in the example 1050, every X symbols instead of every Y symbols (where Y>X). In some implementations this tradeoff is acceptable. The methods 800 of FIG. 8 and 900 of FIG. 9 can be used to transmit and receive the DM-RS as the first symbol of a new cluster, respectively, and simultaneously convey additional information via SBPM. In some embodiments, another symbol (other than the first symbol) of each cluster may be selected for transmitting the DM-RS.

Figure 11:
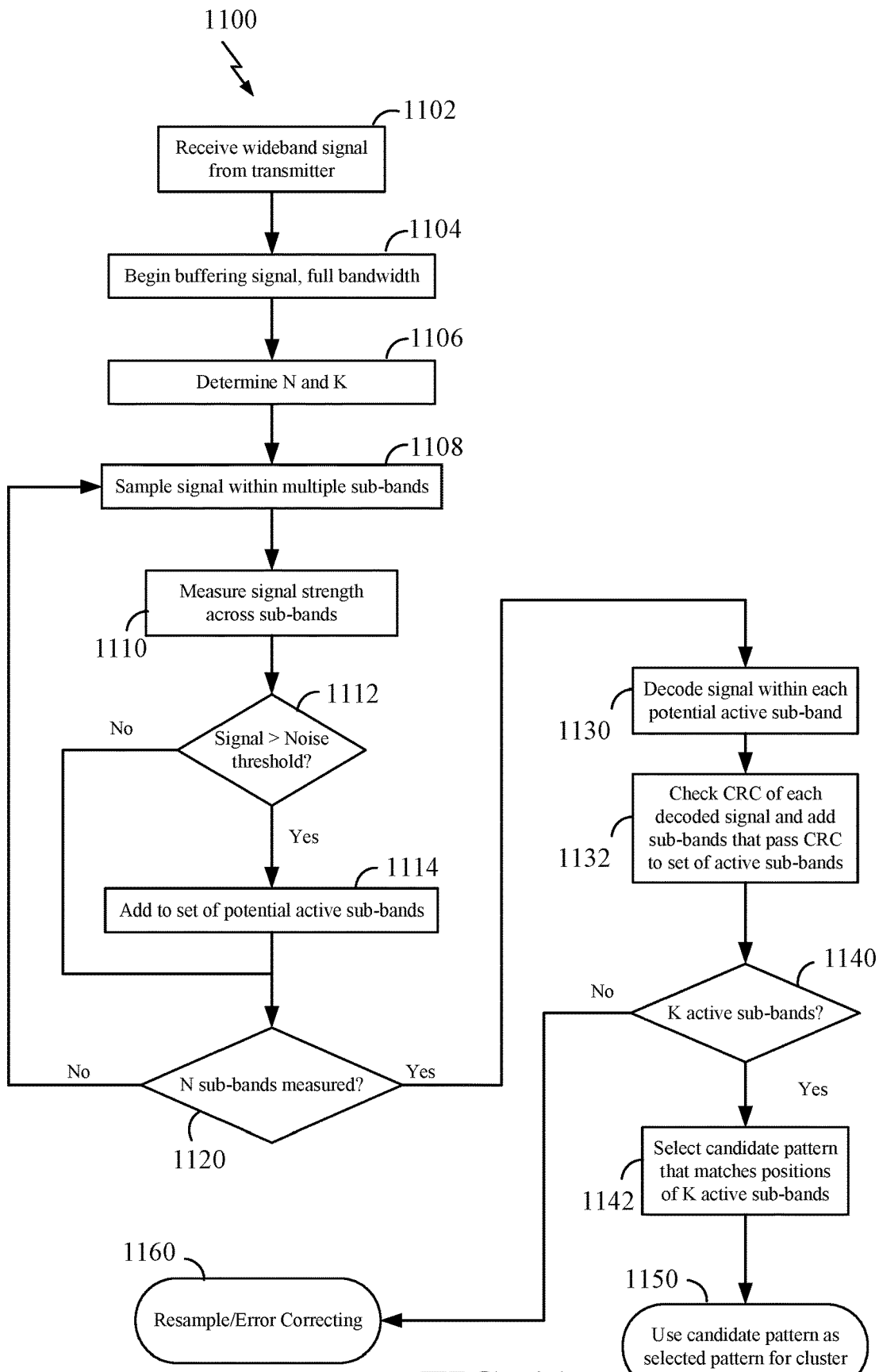
FIG. 11 is yet another example method of receiving and decoding data transmitted using sub-band position modulation according to some aspects.

FIG. 11 illustrates another example method 1100 for receiving data, which may be performed by a UE or a base station using OFDM and SBPM encoding; for example, the method 1100 may be performed on the data transmission produced by method 800 of FIG. 8. As previously explained, at 1102 the receiver receives a wideband data transmission signal from the transmitter; the receiver at 1104 then begins storing the signal in a buffer upon receipt. At 1106, the receiver determines the values for N and K, which may be fixed values stored in memory, or may be transmitted to the receiver. The receiver may then perform initial on/off detection of the N sub-bands, based for example on receipt of the signal representing the first symbol in the first cluster of the data transmission.

In the illustrated example, on/off detection includes a loop of steps 1108-1120 performed in series, in parallel, or in a combination of series and parallel, on multiple sub-bands at once. For example, the receiver may have less than N sensors allocated to the data transmission, so that some or all of the sensors monitor multiple sub-bands for the data signal. In some embodiments, the receiver then performs the loop of on-off detection steps until all N sub-bands have been measured: at 1108, obtain one or more samples of the signal within the sub-bands; at 1110, analyze the samples to determine the signal strength across the sub-bands, such as by determining an average signal strength for all samples, or a peak signal strength among the samples, etc.; at 1112 compare the measured signal strength to a reference signal representing the noise floor or another baseline measurement, and determine whether the measured signal strength exceeds the reference signal by a threshold amount indicating that the signal is likely present within the sub-band; if not, proceed to block 1020; if the measured signal does exceed the threshold, at 1114 add the sub-bands to the set of potential active sub-bands. At 1120, if not all the sub-bands have been measured, the receiver returns to block 1108, but, if all N sub-bands have been measured, the receiver can proceed to block 1130.

At 1130, the receiver may decode the signal within each sub-band in the set of potential active sub-bands to determine (potential) data encoded in the signal within each sub-band. It will be understood that this set includes sub-bands that are adjacent to active sub-bands but may not themselves be active sub-bands; thus, at 1132 the receiver may perform error checking, such as CRC, of the decoded signals on each sub-band (e.g., error checking on the (potential) data of the signal of each sub-band), and may add the sub-bands that pass CRC (and, thus, are considered to have valid data) to a set of active sub-bands. Other forms of multiple hypothesis testing may be used to identify the active sub-bands. At 1140, the receiver may check whether the active sub-band set has K sub-bands in it, and if not, may perform error correction (block 1160). If there are K sub-bands in the set, at 1142 the receiver may match the positions of the active sub-bands to one of the patterns and may use the matching pattern (block 1150) as the selected pattern for the cluster, as described above.

Figure 12:
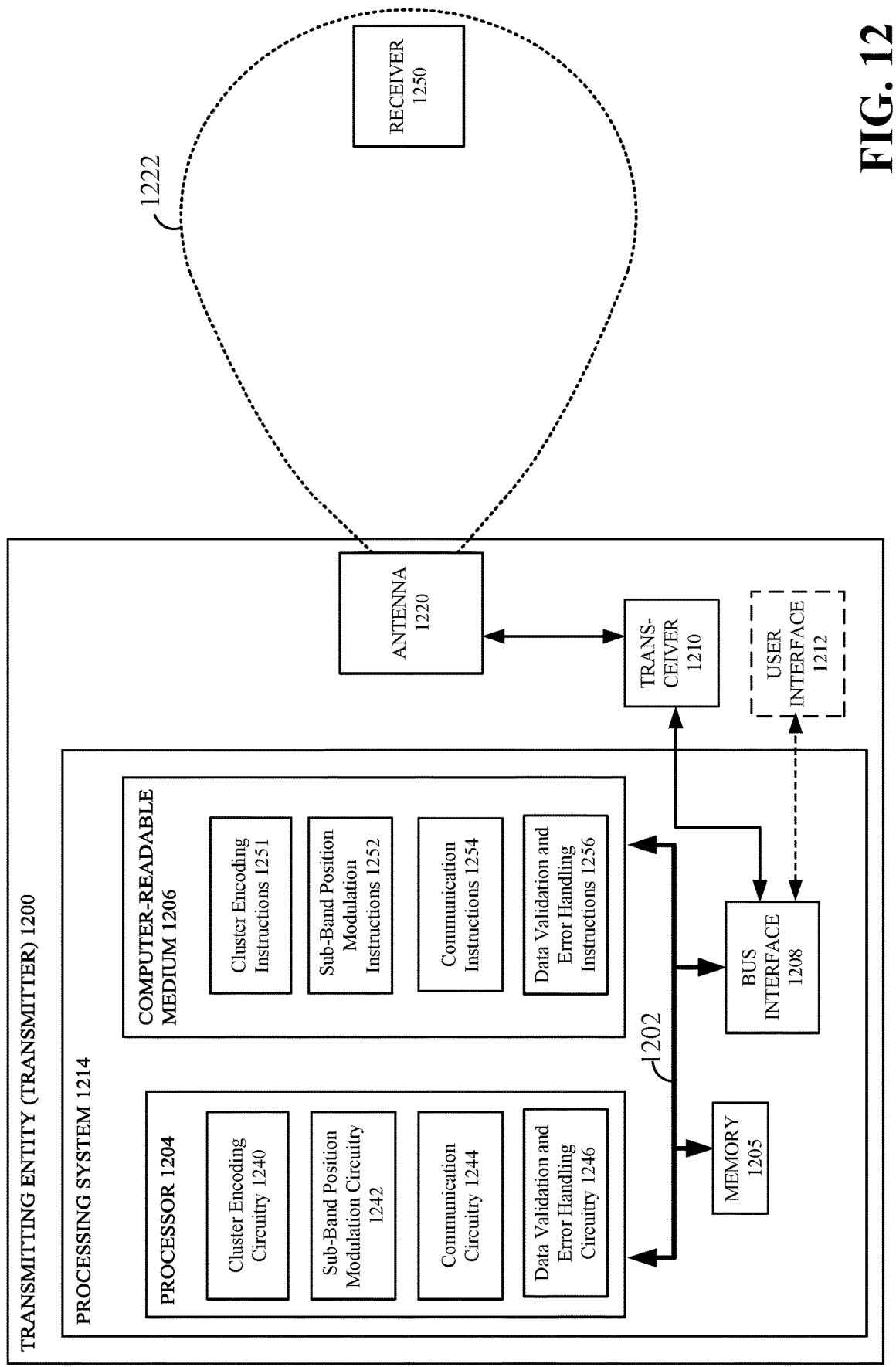
FIG. 12 is a diagram conceptually illustrating an example of a hardware implementation for a transmitting entity according to some aspects of the disclosure.

FIG. 12 is a block diagram illustrating an example of a hardware implementation for a transmitting entity ("transmitter") 1200 employing a processing system 1214. For example, the transmitting entity 1200 may be a user equipment (UE) as illustrated in any one or more of FIGS. 1 and/or 2. In another example, the transmitting entity 1200 may be a base station as illustrated in any one or more of FIGS. 1 and/or 2.

The transmitting entity 1200 may include a processing system 1214 having one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the transmitting entity 1200 may be configured to perform any one or more of the functions described herein. That is, the processor 1204, as utilized in a transmitting entity 1200, may be configured (e.g., in coordination with the memory 1205) to implement any one or more of the processes and procedures described herein and illustrated in FIGS. 4A, 4B, 5, 6, 7, 8, 9, 10, 11, 14, 15, 16, and/or 17 (i.e., FIGS. 4A-11 and/or 14-17).

The processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a communication interface or means for communicating with various other apparatus over a transmission medium. For example, the transceiver 1210 may cooperate with one or more antennas 1220 of the transmitter 1200 to send and receive radio-frequency signals using patterns of radiated power and antenna gain. The Figure illustrates an example of antenna 1220 beamforming to focus the EIRP into a primary lobe 1222 of antenna coverage that is directed at a particular receiver 1250, such as the receiving entity 1300 of FIG. 13. Depending upon the nature of the apparatus, a user interface 1212 (e.g., keypad, display, speaker, microphone, joystick) may also be provided. Of course, such a user interface 1212 is optional, and some examples, such as a base station, may omit it.

In some aspects of the disclosure, the processor 1204 may include cluster encoding circuitry 1240 configured (e.g., in coordination with the memory 1205) for various functions, including, e.g., determining elements of data to encode into OFDM symbols that form the current cluster of symbols to send to a receiving entity. For example, the cluster encoding circuitry 1240 may be configured to implement one or more of the functions described below in relation to FIGS. 6, 8, 14, and 16 including, e.g., blocks 608, 612, 810, 812, 1410, and/or 1610. The processor 1204 may further include sub-band position modulation (SBPM) circuitry 1242 configured (e.g., in coordination with the memory 1205) for various functions, including, e.g., determining which of the sub-bands (i.e., which pattern) will be the active sub-bands carrying the current cluster, and cooperating with the cluster encoding circuitry 1240 to encode the data for transmission within the selected active sub-bands. For example, the SBPM circuitry 1242 may be configured to implement one or more of the functions described below in relation to FIGS. 6, 8, 14, and 16 including, e.g., blocks 606, 816, 806, 808, 1408, and/or 1610. The processor 1204 may further include communication circuitry 1244 configured (e.g., in coordination with the memory 1205) for various functions, including, e.g., determining a frequency bandwidth (e.g., a bandwidth of an active wideband) for transmission having N consecutive frequency sub-bands, determining a bandwidth defined by N consecutive frequency sub-bands, transmitting data over active sub-bands, determining whether additional data remains to be sent, and/or receive error feedback. For example, the communication circuitry 1244 may be configured to implement one or more of the functions described below in relation to FIGS. 6, 8, 14, and 16 including, e.g., blocks 602, 604, 608, 610, 802, 804, 816, 818, 1402, 1404, 1410, 1605, and/or 1610. The processor 1204 may further include data validation and error handling circuitry 1246 configured (e.g., in coordination with the memory 1205) for various functions, including, e.g., determining whether error feedback has been received from a receiver, error handling and retransmission of data (in coordination with the communication circuitry 1244), and/or generating CRC or other validation bits or data for transmission with data. For example, the data validation and error handling circuitry 1246 may be configured to implement one or more of the functions described below in relation to FIGS. 6 and 8 including, e.g., block 620, 622, 814, 820, and 822.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus. The processor 1204 may also use the computer-readable medium 1206 and the memory 1205 for storing data that the processor 1204 manipulates when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206. The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 1206 may store computer-executable code that includes cluster encoding instructions 1251 that configure a transmitting entity 1200 for various functions, including, e.g., determining elements of data to encode into OFDM symbols that form the current cluster of symbols to send to a receiving entity. For example, the cluster encoding instructions 1251 may be configured to cause a transmitting entity 1200 to implement one or more of the functions described below in relation to FIGS. 6, 8, 14, and/or 16, including, e.g., blocks 608, 612, 810, 812, 1410, and/or 1610. The computer-readable storage medium 1206 may further store computer-executable code that includes sub-band position modulation (SBPM) instructions 1252 that configure a transmitting entity 1200 for various functions, including, e.g., determining which of the sub-bands (i.e., which pattern) will be the active sub-bands carrying the current cluster, and cooperating with the cluster encoding circuitry 1240 to encode the data for transmission within the selected active sub-bands. For example, the SBPM instructions 1252 may be configured to cause a transmitting entity 1200 to implement one or more of the functions described below in relation to FIGS. 6, 8, 14, and/or 16, including, e.g., blocks 606, 816, 806, 808, 1408, and/or 1610. The computer-readable storage medium 1206 may further store computer-executable code that includes communication instructions 1254 that configure a transmitting entity 1200 for various functions, including, e.g., determining a frequency bandwidth (e.g., a bandwidth of an active wideband) for transmission having N consecutive frequency sub-bands, determining a bandwidth defined by N consecutive frequency sub-bands, transmitting data over active sub-bands, determining whether additional data remains to be sent, and/or receive error feedback. For example, the communication instructions 1254 may be configured to cause a transmitting entity 1200 to implement one or more of the functions described below in relation to FIGS. 6, 8, 14, and/or 16, including, e.g., blocks 602, 604, 608, 610, 802, 804, 816, 818, 1402, 1404, 1410, 1605, and/or 1610. The computer-readable storage medium 1206 may further store computer-executable code that includes data validation and error handling instructions 1256 that configure a transmitting entity 1200 for various functions, including, e.g., determining whether error feedback has been received from a receiver, error handling and retransmission of data (in coordination with the communication circuitry 1244), and/or generating CRC or other validation bits or data for transmission with data. For example, the data validation and error handling instructions 1256 may be configured to cause a transmitting entity 1200 to implement one or more of the functions described below in relation to FIGS. 6 and/or 8 including, e.g., blocks 620, 622, 814, 820, and 822.

In one configuration, the transmitting entity 1200 for wireless communication includes means for determining a frequency bandwidth for transmission having N consecutive frequency sub-bands, means for transmitting a plurality of transmission clusters, means for selecting active sub-bands of the N consecutive frequency sub-bands for encoding data as an active sub-band position pattern, means for transmitting data over selected active sub-bands, means for transmitting a demodulation reference signal, means for generating CRC and/or other validation bits or data for transmission and for error handling and data retransmission, means for encoding data within a cluster of symbols for transmission on one or more active sub-bands, means for receiving a resource allocation, means for transmitting a wireless communication over K active sub-bands of N frequency sub-bands. In one aspect, the aforementioned means may be the processor(s) 1204 in FIG. 12 configured to perform the functions recited by the aforementioned means. In another aspect, the aforementioned means may be a circuit or any apparatus configured to perform the functions recited by the aforementioned means.

Of course, in the above examples, the circuitry included in the processor 1204 is merely provided as an example, and other means for carrying out the described functions may be included within various aspects of the present disclosure, including but not limited to the instructions stored in the computer-readable storage medium 1206, or any other suitable apparatus or means described in any one of the FIGS. 1 and/or 2, and utilizing, for example, the processes and/or algorithms described herein in relation to FIGS. 4A-11 and/or 14-17.

Figure 13:
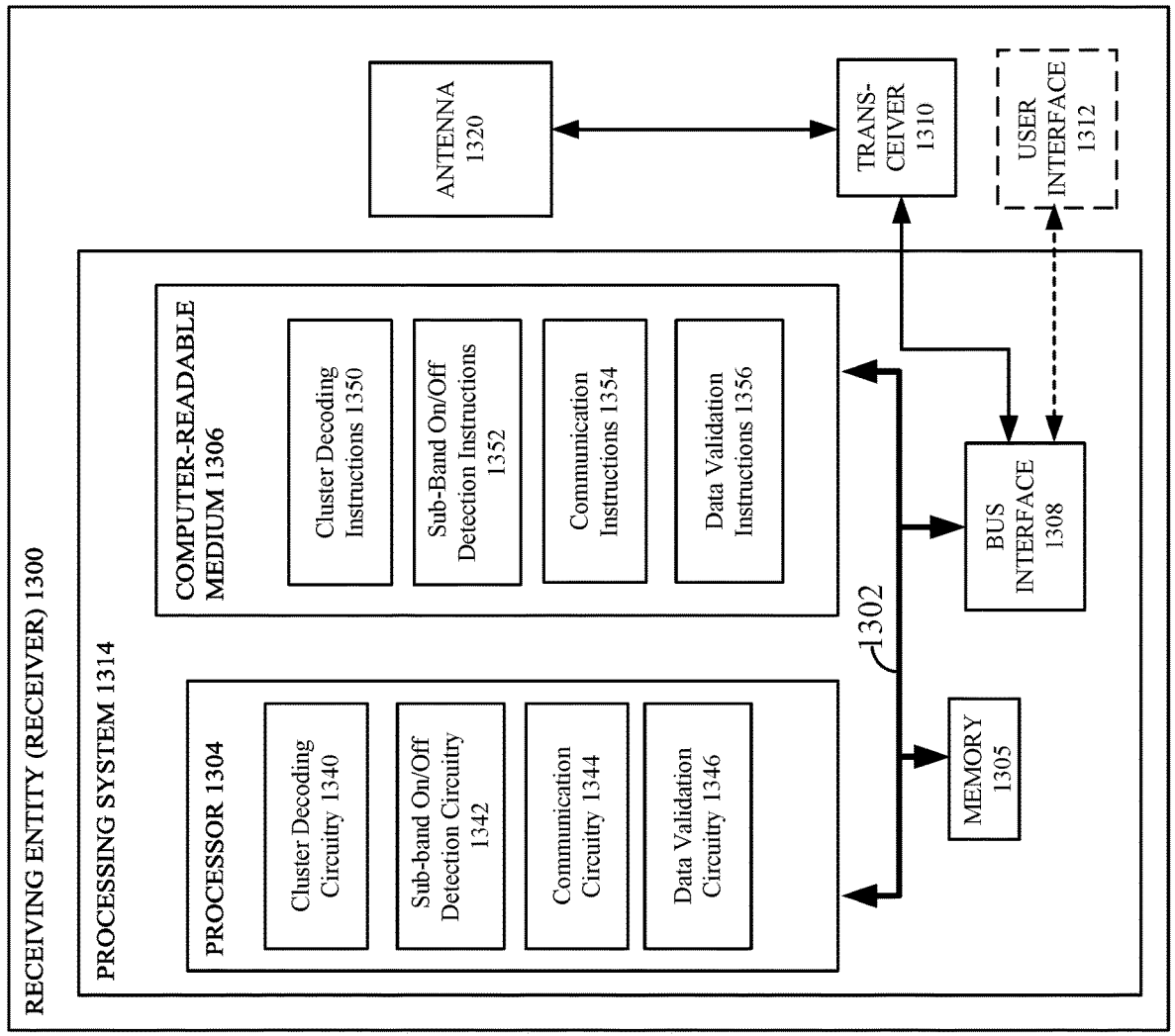
FIG. 13 is a diagram conceptually illustrating an example of a hardware implementation for a receiving entity according to some aspects of the disclosure.

FIG. 13 is a conceptual diagram illustrating an example of a hardware implementation for an exemplary receiving entity 1300 employing a processing system 1314. In accordance with various aspects of the disclosure, a processing system 1314 may include an element, or any portion of an element, or any combination of elements having one or more processors 1304. For example, the receiving entity 1300 may be a user equipment (UE) as illustrated in any one or more of FIGS. 1 and/or 2. In another example, the receiving entity 1300 may be a base station as illustrated in any one or more of FIGS. 1 and/or 2.

The processing system 1314 may be substantially the same as the processing system 1214 illustrated in FIG. 12, including a bus interface 1308, a bus 1302, memory 1305, a processor 1304, and a computer-readable medium 1306. Furthermore, the receiving entity 1300 may include a user interface 1312 and a transceiver 1310 substantially similar to those described above in FIG. 12. That is, the processor 1304, as utilized in a receiving entity 1300, may be configured (e.g., in coordination with the memory 1305) to implement any one or more of the processes described below and illustrated in FIGS. 4A-11 and/or 14-17.

In some aspects of the disclosure, the processor 1304 may include cluster decoding circuitry 1340 configured (e.g., in coordination with the memory 1305) for various functions, including, for example, decoding a data transmission signal received over active sub-bands from its received state into the OFDM symbols encoded in the cluster, and then into the original data. For example, the cluster decoding circuitry 1340 may be configured to implement one or more of the functions described below in relation to FIGS. 7, 9, 11, 15, and/or 17 including, e.g., blocks 724, 940, 942, 950, 960, 1130, 1514, and/or 1710.

In some aspects of the disclosure, the processor 1304 may include sub-band position modulation (SBPM) decoding circuitry 1342 configured (e.g., in coordination with the memory 1305) for various functions, including, for example, determining which of the sub-bands are carrying the data transmission for the present cluster (e.g., on/off detection for each sub-band) and determining the information transmitted using SBPM (i.e., which active sub-band pattern was used). For example, the SBPM decoding circuitry 1342 may be configured to implement one or more of the functions described below in relation to FIGS. 7, 9, 11, 15, and/or 17 including, e.g., blocks 708, 904, 906, 908, 910, 912, 920, 930, 932, 1106, 1108, 1110, 1112, 1114, 1120, 1140, 1142, 1150, 1510, 1512, and/or 1710.

In some aspects of the disclosure, the processor 1304 may include communication circuitry 1344 configured (e.g., in coordination with the memory 1305) for various functions, including, for example, determining a frequency bandwidth (e.g., a bandwidth of an active wideband) for transmission having N consecutive frequency sub-bands, determining a bandwidth defined by N consecutive frequency sub-bands, receiving data over active sub-bands, determining whether additional data remains to be sent, transmit error feedback, and/or transmit a frequency bandwidth (resource allocation) to a transmitting entity. For example, the communication circuitry 1344 may be configured to implement one or more of the functions described below in relation to FIGS. 7, 9, 11,

15, and/or 17 including, e.g., blocks 702, 704, 706, 710, 712, 902, 952, 954, 1102, 1104, 1106, 1502, 1504, 1508, 1516, 1705, and/or 1710.

In some aspects of the disclosure, the processor 1304 may include data validation circuitry 1346 configured (e.g., in coordination with the memory 1305) for various functions, including, for example, performing error checks on receive signals and determining whether to send error feedback to a transmitting entity. For example, the data validation circuitry 1346 may be configured to implement one or more of the functions described below in relation to FIGS. 7, 9, 11, 15, and/or 17 including, e.g., blocks 720, 722, 730, 944, 1132, 1514, and/or 1710.

And further, the computer-readable storage medium 1306 may store computer-executable code that includes cluster decoding instructions 1350 that configure a receiving entity 1300 for various functions, including, e.g., decoding a data transmission signal received over active sub-bands from its received state into the OFDM symbols encoded in the cluster, and then into the original data. For example, the cluster decoding instructions 1350 may be configured to cause a receiving entity 1300 to implement one or more of the functions described below in relation to FIGS. 7, 9, 11, 15, and/or 17, including, e.g., blocks 724, 940, 942, 950, 960, 1130, 1514, and/or 1710.

The computer-readable storage medium 1306 may further store computer-executable code that includes sub-band position modulation (SBPM) decoding instructions 1352 that configure a receiving entity 1300 for various functions, including, e.g., determining which of the sub-bands are carrying the data transmission for the present cluster (e.g., on/off detection for each sub-band) and determining the information transmitted using SBPM (i.e., which active sub-band pattern was used). For example, the SBPM decoding instructions 1352 may be configured to cause a receiving entity 1300 to implement one or more of the functions described below in relation to FIGS. 7, 9, 11, 15, and/or 17, including, e.g., blocks 708, 904, 906, 908, 910, 912, 920, 930, 932, 1106, 1108, 1110, 1112, 1114, 1120, 1140, 1142, 1150, 1510, 1512, and/or 1710.

The computer-readable storage medium 1306 may further store computer-executable code that includes communication instructions 1354 that configure a receiving entity 1300 for various functions, including, e.g., determining a frequency bandwidth (e.g., a bandwidth of an active wideband) for transmission having N consecutive frequency sub-bands, determining a bandwidth defined by N consecutive frequency sub-bands, receiving data over active sub-bands, determining whether additional data remains to be sent, transmit error feedback, and/or transmit a frequency bandwidth (resource allocation) to a transmitting entity. For example, the communication instructions 1354 may be configured to cause a receiving entity 1300 to implement one or more of the functions described below in relation to FIGS. 7, 9, 11, 15, and/or 17, including, e.g., blocks 702, 704, 706, 710, 712, 902, 952, 954, 1102, 1104, 1106, 1502, 1504, 1508, 1516, 1705, and/or 1710.

The computer-readable storage medium 1306 may further store computer-executable code that includes data validation instructions 1356 that configure a receiving entity 1300 for various functions, including, e.g., performing error checks on receive signals and determining whether to send error feedback to a transmitting entity. For example, the data validation instructions 1356 may be configured to cause a receiving entity 1300 to implement one or more of the functions described below in relation to FIGS. 7, 9, 11, 15, and/or 17, including, e.g., blocks 720, 722, 730, 944, 1132, 1514, and/or 1710.

In one configuration, the receiving entity 1300 for wireless communication includes means for determining a frequency bandwidth for transmission having N consecutive frequency sub-bands, means for receiving a plurality of transmission clusters, means for receiving a data transmission signal including K active sub-bands of the N consecutive frequency sub-bands, means for determining an active sub-band position pattern of the K active sub-bands, means for decoding a portion of data based on an active sub-band position pattern, means for decoding a portion of data sent via the K active sub-bands, means for transmitting a frequency bandwidth to a transmitting entity, means for transmitting a resource allocation to a transmitting entity, and means for receiving a wireless communication over K active sub-bands from a transmitting entity. In one aspect, the aforementioned means may be the processor(s) 1304 shown in FIG. 13 configured to perform the functions recited by the aforementioned means. In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIG. 1, and/or 2, and utilizing, for example, the processes and/or algorithms described herein in relation to FIGS. 4A-11 and/or 14-17.

Figure 14:
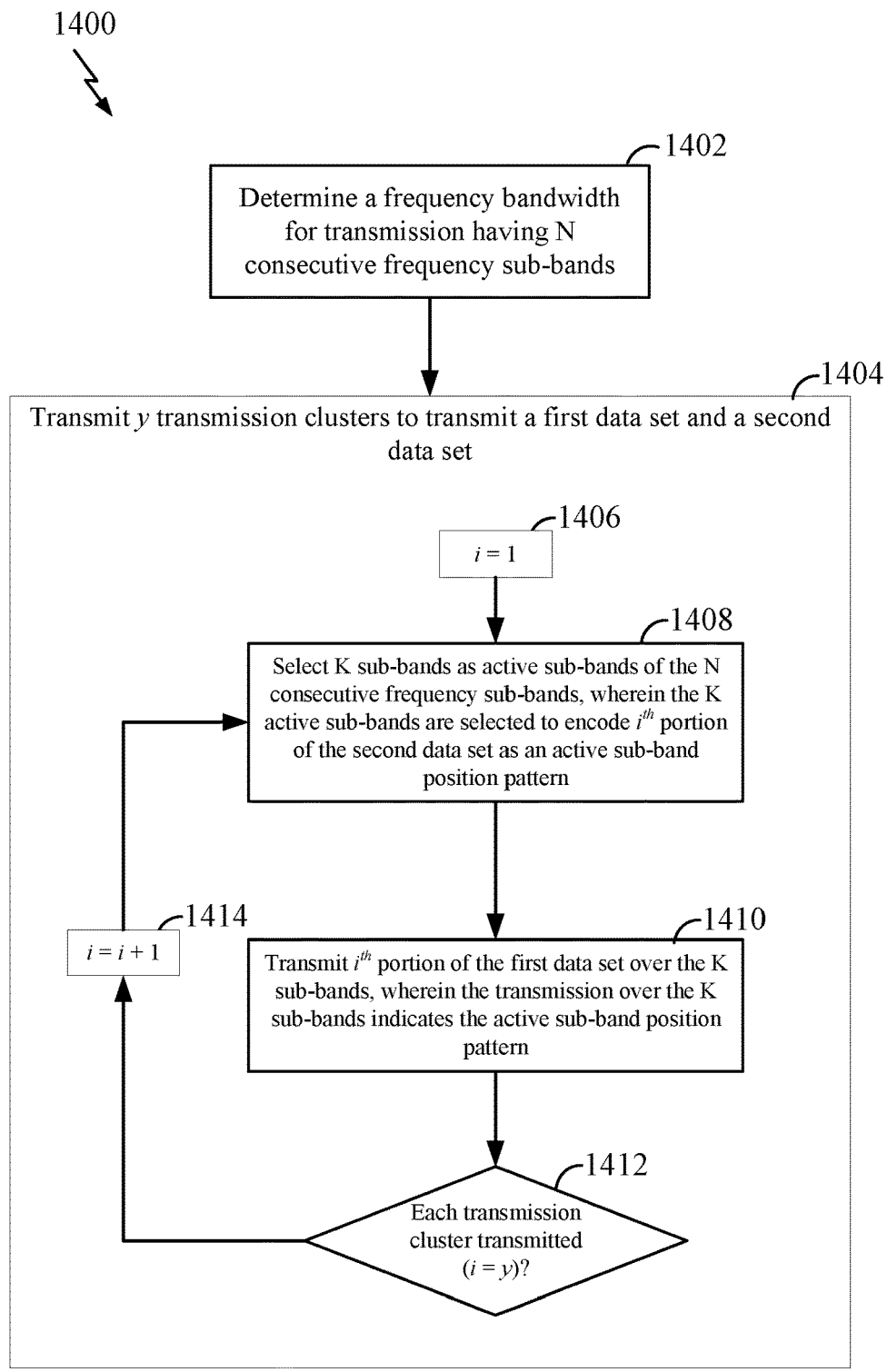
FIG. 14 is a flowchart of an example process for transmitting wireless communications including sub-band position modulation according to some aspects of the disclosure.

FIG. 14 is a flow chart illustrating an exemplary process 1400 for transmitting wireless communications including sub-band position modulation in accordance with some aspects of the present disclosure. As described below, a particular implementation may omit some or all illustrated features, and may not require some illustrated features to implement all embodiments. In some examples, the transmitting entity 1200 illustrated in FIG. 12 may be configured to carry out the process 1400. In some examples, any suitable apparatus or means for carrying out the functions or algorithm described below may carry out the process 1400.

At block 1402, the transmitting entity 1200 determines a frequency bandwidth for transmission, where the frequency bandwidth has N frequency sub-bands. For example, as described with respect to block 602 of FIG. 6 and 802 of FIG. 8, the transmitting entity 1200 (e.g., a UE) may receive a resource allocation from a receiving entity, such as the receiving entity 1300 (e.g., a base station or other scheduling entity), indicating the frequency bandwidth available for transmission. For example, the receiving entity 1300 may transmit a resource allocation over a wireless network indicating one or more resource block groups (see, e.g., resource block group (RBG) 380 of FIG. 3), which indicate a particular frequency bandwidth. In other embodiments, such as where the transmitting entity 1200 is a base station or other scheduling entity, the transmitting entity 1200 may determine a resource allocation based on various factors, such as one or more of an amount of data to transmit, time conditions for the transmission, network traffic, network conditions, total available resources, and the like.

The determined frequency bandwidth has N frequency sub-bands, which the transmitting entity 1200 may determine, as described with respect to block 604 of FIG. 6 and/or block 804 of FIG. 8. In some examples, the N frequency sub-bands may be consecutive and of uniform size, and N may be an integral value of 2 or more. The frequency bandwidth may be referred to as a wideband allocation when the frequency bandwidth includes multiple consecutive sub-bands over which data may be transmitted in parallel.

At block 1404, the transmitting entity 1200 transmits a plurality transmission clusters (e.g., y transmission clusters) to transmit a first data set and a second data set. As described with respect to blocks 1406-1414, for each transmission cluster, the transmitting entity 1200 may (a) select K sub-bands as active sub-bands of the N frequency sub-bands, where the K active sub-bands are selected to encode a portion of the second data set as an active sub-band position pattern, and (b) transmit a portion of the first data set over the K active sub-bands, where the transmission over the K sub-bands indicates the active sub-band position pattern.

More particularly, starting in block 1406, the transmitting entity 1200 may set a variable i equal to one (i.e., i=1). For example, the processor 1204 may maintain the variable i in a register of the processor 1204, the memory 1205, or another storage device. In some examples, during the course of performing block 1404, the variable i may have a value between 1 and y, where each value for the variable i may indicate a particular transmission cluster of the plurality of transmission clusters.

In block 1408, the transmitting entity 1200 selects K sub-bands as active sub-bands of the N frequency sub-bands. The K active sub-bands are selected to encode an $i^{th}$ portion of the second data set as an active sub-band position pattern, such as described with respect to blocks 606 of FIG. 6 and/or 808 of FIG. 8. For example, the transmitting entity 1200 may have a data buffer (e.g., as part of the processor 1204 or the memory 1205) that receives and temporarily stores the second data set to be transmitted using sub-band position modulation. The second data set may include data from one or more sources or streams that may continuously, intermittently, or periodically enter the data buffer at an input side. The transmitting entity 1200 may then pull data incrementally from an output side of the data buffer (e.g., to implement a first in first out (FIFO) buffer) for transmission via the sub-band position modulation. For example, the transmitting entity 1200 may pull (e.g., read or load) a portion of the second data of a predetermined quantity. The transmitting entity 1200 may then encode (e.g., translate or convert) the portion to an active sub-band position pattern. For example, the transmitting entity 1200 may include a lookup table that maps each potential set of data values for a portion of the second data to a particular or unique active sub-band position pattern. The transmitting entity 1200 may access the lookup table with the $i^{th}$ portion of the second data, and the lookup table may provide an active sub-band position pattern in return.

Table 1 illustrates an example lookup table mapping where the portion size for the portion of the second data set is two (2) bits, the transmission cluster has N=4 (total sub-bands of frequency bandwidth), and K=2 (active sub-bands). In other words, each sub-band position pattern includes four sub-band positions, two of which are active and two of which are inactive (like the example of FIG. 5), and the pattern resulting from the active and inactive sub-bands encodes the portion of the second data to be transmitted. This table is merely an example, and different types and quantities of data may be encoded and different patterns may be generated using different values for N and K. For example, the last two patterns of Table 1 may, in some examples, represent two different three-bit values (e.g., 000 and 111). Further, in some embodiments, the portion of data to be encoded is not a binary (base-2) number but, rather, a number of a different base (e.g., base-3, base-10, etc.). Further, in some examples, the portion of the data to be encoded is a non-numerical value (e.g., a state or condition). Accordingly, in the below example with N=4 and K=2, the active sub-band position patterns may represent one of six different states or conditions.

TABLE 1

| Portion of the Second Data Set | Active Sub-Band Position Pattern N = 4; K = 2 (0 = inactive sub-band; 1 = active sub-band) |
|---|---|
| 00 | 0 0 1 1 |
| 01 | 0 1 0 1 |
| 10 | 0 1 1 0 |
| 11 | 1 0 1 0 |
| Null | 1 1 0 0 |
| Null | 1 0 0 1 |

In block 1410, the transmitting entity 1200 transmits an $i^{th}$ portion of the first data set over the K active sub-bands. The transmission in block 1410 over the K sub-bands indicates the active sub-band position pattern. For example, the processor 1204 may control the transceiver 1210 to drive the antenna 1220 to transmit the $i^{th}$ portion of the first data set over the K active sub-bands. This transmission may be similar to the transmission of blocks 606 of FIG. 6 and/or 816 of FIG. 8.

In some examples, the transmitting entity 1200 may have another data buffer (e.g., in the processor 1204 or the memory 1205) that receives and temporarily stores the first data set to be transmitted over the selected K active sub-bands. The first data set may include data from one or more sources or streams that may continuously, intermittently, or periodically enter the data buffer at an input side. The transmitting entity 1200 may then pull data incrementally from an output side of the data buffer (e.g., to implement a first in first out (FIFO) buffer) for transmission via the K active sub-bands. For example, the transmitting entity 1200 may pull (e.g., read or load) a portion of the first data of a predetermined quantity. The transmitting entity 1200 may then encode (e.g., translate or convert) the portion of the first data and transmit the encoded portion over the K active sub-bands.

For example, the transmitting entity 1200 may encode the $i^{th}$ portion of the first data into a cluster of X OFDM symbols (e.g., the number of symbols per transmission cluster) for each of the K active sub-bands. The transmitting entity 1200 may apply an inverse fast Fourier transform (IFFT) to the first symbol of each of the K active sub-bands to produce a data transmission signal in the time domain (see, e.g., symbol 520a of FIG. 5), and may further iteratively perform an IFFT for each symbol of each of the K active sub-bands to produce further data transmission signals in the time domain. The transmitting entity 1200 may serially transmit the generated data transmission signals for the cluster (collectively, the cluster data transmission signal) over the K active sub-bands. In some examples, the transmitter entity 1200 may generate a CRC or other error checking or validation bits from the cluster data transmission signal, for each of the data transmission signals, from each OFDM cluster for a particular sub-band, and attach the CRC(s) to one of the data transmission signals or the cluster data transmission signal.

In block 1412, the transmitting entity 1200 determines whether each of the transmission clusters has been transmitted. For example, the transmitting entity 1200 determines whether the variable i equals the number of transmission clusters (y), or whether one or both of the data buffers for the first and second data are empty. When each of the transmission clusters has been transmitted (e.g., the variable i=y), the transmitting entity 1200 may exit the process 1400. When each of the transmission clusters has not yet been transmitted (e.g., the variable i does not equal y), the transmitting entity 1200 proceeds to block 1414 and increments the variable i (e.g., i=i+1), and then returns to block 1408 to select the next K sub-bands as active sub-bands.

In some embodiments, the first data set and the second data set may be transmitted using a different number of transmission clusters. For example, the first data set may be transmitted over 10 transmission clusters, while the second data set may be transmitted over 8 transmission clusters. In such examples, the transmitting entity 1200 may transmit null data in place of certain portions of the first or second data to fill the additional transmission space (e.g., the final two active sub-band position patterns for i=9 and i=10 may represent a null value). The particular values 10 and 8 are merely for illustration purposes; the particular number of transmission clusters may vary and, in some cases, may be less than or significantly greater than 10.

The first data set may include one or more streams of data of various sizes and types and the second data set may also include one or more streams of data of various sizes and types. Additionally, first and/or second data sets may not be known in their entirety at the start of the process 1400 or the block 1404. Thus, the number of transmission clusters may also not be known at the start of the process 1400 or the block 1404. Rather, in some examples, the first data set and/or second data set may continue to be generated and/or retrieved as the process 1400 and the block 1404 continues to be executed. For example, the transmitting entity 1200 may execute block 1404 until, in block 1412, the transmitting entity 1200 determines that the first data set and the second data set have been completely transmitted (e.g., by accessing the first and second data buffers and determining that no further data is present for transmission).

In some examples, the first and second data sets provide related information. For example, the first data set may include a stream of uplink traffic while the second data set may provide uplink control signals data for the uplink traffic. In other examples, the first data set and the second data set may include unrelated information. For example, the first data set may include first uplink traffic and the second data set may include second uplink traffic or control for another purpose unrelated to the first content data.

The first data and the second data may each include various types of information. For example, the first data may include any uplink or downlink traffic or control that may be transmitted in a RAN such as RAN 104. Additionally, for example, the second data may include PDCCH and PUCCH transmissions, transmissions of DCI or UCI, and/or transmissions of control, downlink feedback, and other information from or to a UE operating with an autonomous uplink to one or more base stations. In some examples, other types of information is transmitted as the second data (i.e., via the sub-band position modulation technique), including any uplink or downlink traffic or control that may be transmitted in a RAN such as RAN 104.

Figure 15:
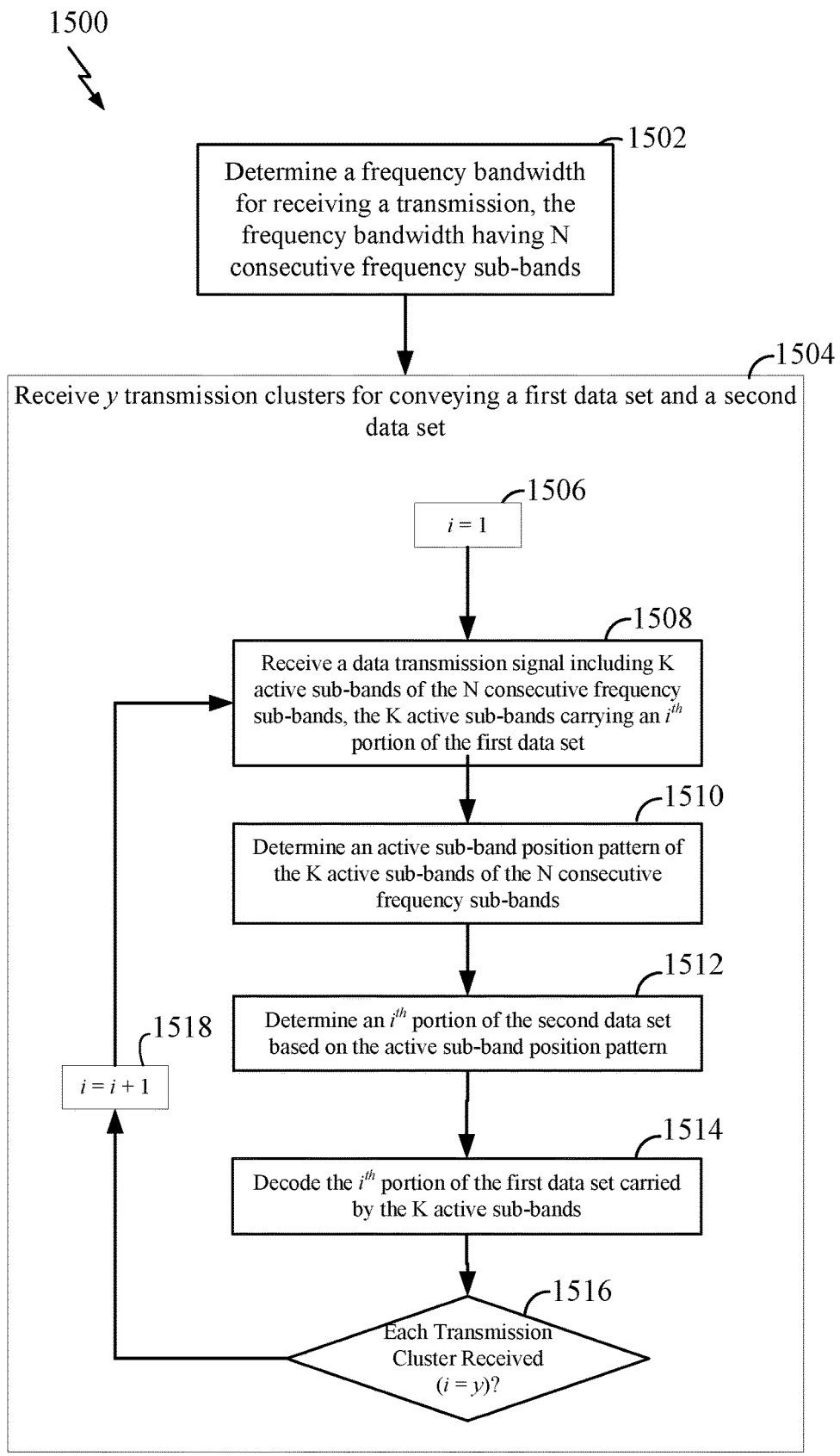
FIG. 15 is a flowchart of an example process for receiving wireless communications including sub-band position modulation according to some aspects of the disclosure.

FIG. 15 is a flow chart illustrating an exemplary process 1500 for receiving wireless communications including sub-band position modulation in accordance with some aspects of the present disclosure. As described below, a particular implementation may omit some or all illustrated features, and may not require some illustrated features to implement all embodiments. In some examples, the receiving entity 1300 illustrated in FIG. 13 may be configured to carry out the process 1500. In some examples, any suitable apparatus or means for carrying out the functions or algorithm described below may carry out the process 1500.

At block 1502, the receiving entity 1300 determines a frequency bandwidth for receiving a transmission, where the frequency bandwidth has N frequency sub-bands. The receiving entity 1300 may determine the frequency bandwidth as described above with respect to block 702 of FIG. 7. For example, when the receiving entity 1300 is a base station or other scheduling entity, the receiving entity 1300 may determine a resource allocation based on various factors, such as one or more of an amount of data to transmit, time conditions for the transmission, network traffic, network conditions, total available resources, and the like. For example, an equation or lookup table may map one or more of these inputs to a resource allocation output. The resource allocation may indicate one or more resource block groups (see, e.g., resource block group (RBG) 380 of FIG. 3), which indicate a particular frequency bandwidth. The receiving entity 1300 may then transmit the resource allocation (indicating the frequency bandwidth) to the transmitting entity 1200 to schedule a wireless transmission (e.g., an uplink transmission). In other embodiments, as described with respect to block 702 of FIG. 7, the receiving entity 1300 (e.g., a UE) may receive a resource allocation from a transmitting entity, such as the transmitting entity 1200 (e.g., a base station or other scheduling entity), indicating the frequency bandwidth available for transmission. For example, the transmitting entity 1200 may transmit a resource allocation over a wireless network that is received by the receiving entity 1300 and that indicates one or more resource block groups (see, e.g., resource block group (RBG) 380 of FIG. 3), which indicate a particular frequency bandwidth.

The determined frequency bandwidth has N frequency sub-bands, which the receiving entity 1300 may determine, as described with respect to block 704 of FIG. 7. The N frequency sub-bands may be consecutive and of uniform size, and N may be an integral value of 2 or more.

At block 1504, the receiving entity 1300 receives a plurality transmission clusters (e.g., y transmission clusters) for conveying a first data set and a second data set to the receiving entity 1300. As described with respect to blocks 1506-1518, for each transmission cluster, the receiving entity 1300 may (a) receive a data transmission signal including K active sub-bands of the N frequency sub-bands, the K active sub-bands carrying a portion of the first data set; (b) determine an active sub-band position pattern of the K active sub-bands of the N frequency sub-bands; and (c) decode the portion of the second data set based on the active sub-band position pattern.

More particularly, starting in block 1506, the transmitting entity 1200 may set a variable i equal to one (i.e., i=1). For example, the processor 1304 may maintain the variable i in a register of the processor 1304, the memory 1305, or another storage device. In some examples, during the course of performing block 1504, the variable i may have a value between 1 and y, where each value for the variable i may indicate a particular transmission cluster of the plurality of transmission clusters.

In block 1508, the receiving entity 1300 receives a data transmission signal including K active sub-bands of the N frequency sub-bands. The K active sub-bands carry an $i^{th}$ portion of the first data set. In some examples, the receiving entity 1300 receives the data transmission signal similar to as described with respect to block 706 of FIG. 7, block 902 of FIG. 9, and/or block 1102 of FIG. 11. For example, the processor 1304 may receive via the transceiver 1310 and the antenna 1320 to the data transmission signal. At the initial point of reception of the data transmission signal, the receiving entity 1300 may not be aware of which sub-bands of the N frequency sub-bands are active sub-bands Accordingly, in block 1510, the receiving entity 1300 determines an active sub-band position pattern of the K active sub-bands of the N frequency sub-bands. For example, the receiving entity 1300 may perform an on/off detection for each sub-band of the N frequency sub-bands for a first symbol duration (or another duration or time period) of the data transmission signal, such as described above with respect to blocks 904-912 of FIG. 9 and/or blocks 1106-1140 of FIG. 11. For example, to perform the on/off detection, the receiving entity 1300 may sample the data transmission signal during the first symbol duration at each sub-band of the N sub-bands and measure an associated signal strength of the sample for each sub-band. The receiving entity 1300 may then compare the measured signal strength for each sub-band to a threshold (e.g., a noise threshold). For each sample having a measured signal strength above the threshold, the receiving entity 1300 may consider the associated sub-band as being an active sub-band. For each sample having a measured signal strength below the threshold, the receiving entity 1300 may consider the associated sub-band as being an inactive sub-band. The receiving entity 1300 may then determine the active sub-band position pattern to be the pattern of the active and inactive sub-bands of the N frequency sub-bands (e.g., ordered from lowest to highest sub-band, or from highest to lowest sub-band). Accordingly, the receiving entity 1300 may use "blind" detection to determine the active sub-band position pattern.

In block 1512, the receiving entity 1300 determines an $i^{th}$ portion of the second data set based on the active sub-band position pattern. In some examples, the receiving entity 1300 may determine, or decode, the $i^{th}$ portion of the second data as described above with respect to block 932 and/or block 1142 of FIG. 11. In some examples, the receiving entity 1300 may perform the inverse of the encoding action performed by a transmitting entity as described with respect to block 1408.

For example, the receiving entity 1300 may include a lookup table that maps each potential active sub-band position pattern to a set of data values for the $i^{th}$ portion of the second data. The receiving entity 1300 may access the lookup table with the active sub-band position pattern, which may provide the $i^{th}$ portion of the second data in return. As previously described, Table 1 illustrates an example lookup table mapping of active sub-band position patterns to unique portions of the second data. As previously noted, the table is merely an example, and different types and quantities of data may be encoded and different patterns may be generated using different values for N and K. For example, the last two patterns of Table 1 may, in some examples, represent two different three-bit values (e.g., 000 and 111). Further, in some embodiments, the portion of the second data is not a binary (Base-2) number but, rather, a number of a different base (e.g., base-3, base 10, etc.). Further, in some examples, the portion of the second data is a non-numerical value (e.g., a state). Accordingly, in the Table 1 example with N=4 and K=2, the active sub-band position patterns may represent one of six different states.

In block 1514, the receiving entity 1300 decodes the $i^{th}$ portion of the first data set carried by the K active sub-bands. In some examples, the receiving entity 1300 performs the decoding as described above with respect to blocks 940 and 942 of FIG. 9 and/or block 1130 of FIG. 11. For example, the receiving entity 1300 may perform a respective FFT for each symbol of K active sub-bands of the received data transmission signal of the $i^{th}$ transmission cluster to demultiplex each symbol into its corresponding set of resource elements (REs). The receiving entity 1300 may further demodulate the symbols in the REs by generating a hypothesis as to the set of bits each respective symbol represents. The receiving entity 1300 may then decode the demodulated data to produce the originally encoded $i^{th}$ portion of the first data.

In some examples, where a CRC is transmitted as part of the data transmission signal, the receiving entity 1300 may identify a CRC value in the $i^{th}$ portion of the first data, and may generate a corresponding CRC value from the $i^{th}$ portion of the first data. The receiving entity 1300 may then check for a match between the received and generated CRC values, validating the data upon a match and invalidating the data upon a mismatch. Upon a mismatch, the receiving entity 1300 may initiate or request retransmission of the $i^{th}$ portion of the first data.

In block 1516, the receiving entity 1300 determines whether each of the transmission clusters has been received. For example, the receiving entity 1300 determines whether the variable i equals the number of transmission clusters (y). When the variable i=y (i.e., the transmission is complete), the receiving entity 1300 may exit the process 1500. When the variable i does not equal x, the receiving entity 1300 proceeds to block 1518 and increments the variable i (e.g., i=i+1), and then returns to block 1508 to receive the data transmission signal for the next transmission cluster. Thus, the receiving entity 1300 may receive the transmission clusters in series, one after the other.

In some examples, after each transmission cluster is decoded (e.g., after each pass through block 1514), the receiving entity 1300 may assemble the portions of the first data from transmissions 1 through i and assembly the portions of the second data from transmission 1 through i. For example, each newly decoded ($i^{th}$) portion of the first data may be concatenated to the end of the previous portion or portions of the first data set received and decoded thus far in block 1504. Thus, the first data set may be iteratively constructed or assembled by the receiving entity 1300, a portion at a time as it is received and decoded, until the entire first data set is assembled. Similarly, the second data set may be iteratively constructed or assembled by the receiving entity 1300, a portion at a time as it is received and determined (or decoded), until the entire second data set is assembled. Depending on the particular data making up the first and second data sets, the receiving entity 1300 may perform the assembly of these data sets using alternate techniques. For example, as noted, the first data set may include multiple data sources or streams and, accordingly, the first data set may not be assembled together into a singular data set but, rather, may include the assembly of subsets of data. As another example, the first data set and the second data sets may be part of a single data stream such that the second data set is concatenated with the first data set. For example, for each transmission cluster, the $i^{th}$ portion of the second data set may be concatenated to the $i^{th}$ portion of the first data set, and these portions may be concatenated to a previously decoded or determined portions from earlier transmission clusters.

In some examples, the receiving entity 1300 further stores, displays, and/or otherwise uses the first and/or second data set after the process 1500 is completed and/or while the process 1500 remains in progress (e.g., incrementally as each portion is decoded). For example, the receiving entity 1300 may store the first and/or second data set in the memory 1305. Additionally, the receiving entity 1300 may display the first and/or second data set (e.g., on the user interface 1312). Further, an application executing on the processor 1304 may receive and use the first and/or second data set for various purposes.

In some examples, the first data set and the second data set may be received over a different number of transmission clusters. For example, the first data set may be transmitted over 10 transmission clusters, while the second data set may be transmitted over 8 transmission clusters. In such examples, the receiving entity 1300 may receive null data in place of certain portions of the first or second data to fill the additional transmission space (e.g., the final two active sub-band position patterns for i=9 and i=10 may represent a null value). The particular values 10 and 8 are merely for illustration purposes; the particular number of transmission clusters may vary and, in some cases, may be less than or significantly greater than 10.

The first data set may include one or more streams of data of various sizes and types and the second data set may also include one or more streams of data of various sizes and types. Additionally, the number of transmission clusters may also not be known at the start of the process 1500 or the block 1504. Rather, in some examples, the receiving entity 1300 may continue to loop and execute blocks 1506-1518 until no further data is being received in the N frequency sub-bands or information within the data transmission signal (or another transmitted signal) indicates that the transmission is complete.

In some examples, the first and second data sets provide related information. For example, the first data set may include a stream of uplink traffic while the second data set may provide uplink control signals data for the uplink traffic. As another example, the first data set and the second data sets may be part of a single data stream such that the second data set is concatenated with the first data set (e.g., for each transmission cluster, the $i^{th}$ portion of the second data set is concatenated to the $i^{th}$ portion of the first data set, or the second data set assembled after the y transmission clusters is concatenated to the first data set). In other examples, the first data set and the second data set may include unrelated information. For example, the first data set may include first uplink traffic and the second data set may include second uplink traffic or control for another purpose unrelated to the first content data.

The first data and the second data may each include various types of information. For example, the first data may include any uplink or downlink traffic or control that may be transmitted in a RAN such as RAN 104. Additionally, for example, the second data may include PDCCH and PUCCH transmissions, transmissions of DCI or UCI, and/or transmissions of control, downlink feedback, and other information from or to a UE operating with an autonomous uplink to one or more base stations. In some examples, other types of information is transmitted as the second data (i.e., via the sub-band position modulation technique), including any uplink or downlink traffic or control that may be transmitted in a RAN such as RAN 104.

Although the processes 1400 and 1500 of FIGS. 14 and 15, respectively, have been discussed with respect to transmission and reception of the first data using OFDM, in some examples, other modulation and/or multiplexing techniques are used. For example, in some examples, the transmitting entity 1200 and/or receiving entity 1300 implement the sub-band position modulation techniques described herein with respect to wireless transmissions transmitted via single carrier frequency division multiplexing (SC-FDM), such as single carrier frequency division multiple access (SC-FDMA). In these examples, a single active sub-carrier may be used to transmit data (e.g., the first data in the processes 1400 and 1500), and the position of the single active sub-carrier may encode further information (e.g., the second data in the processes 1400 and 1500). In other words, with respect to the processes 1400 and 1500, K=1. Relative to OFDM with K>1, the transmitting entity 1200 may use SC-FDM to reduce overall power used in wireless transmissions because the transmitting entity 1200 is transmitting over fewer sub-carriers and/or to increase the transmission power of the particular active sub-carrier without increasing the overall transmission power of the transmitting entity 1200. Table 2 (below) is another example mapping of data to active sub-band position patterns, which is similar to Table 1 above, except that K=1 (e.g., for SC-FDM). As shown, with N=4 and K=1, four potential unique active sub-band position patterns may be used, rather than six when N=4 and K=2.

TABLE 2

| Portion of the Second Data Set | Active Sub-Band Position Pattern N = 4; K = 1 (0 = inactive sub-band; 1 = active sub-band) |
|---|---|
| 00 | 0 0 0 1 |
| 01 | 0 0 1 0 |
| 10 | 0 1 0 0 |
| 11 | 1 0 0 0 |

Additionally, in some examples, the transmitting entity 1200 and the receiving entity 1300 use the sub-band position modulation techniques described herein (e.g., for the processes 1400 and 1500) with respect to wireless transmissions transmitted via other frequency division multiplexing techniques.

Additionally, the transmissions of transmission clusters in the process 1400 and receptions of transmission clusters in the process 1500 may be communications of various types, such as one or more of uplink communications, downlink communications, sidelink communications, communications in a mesh network, and the like. Similarly, a transmitting entity 1200 implementing the process 1400 may be a base station, a user equipment, or another type of communication device. Further, a receiving entity 1300 implementing the process 1500 may be a base station, a user equipment, or another type of communication device.

Figure 16:
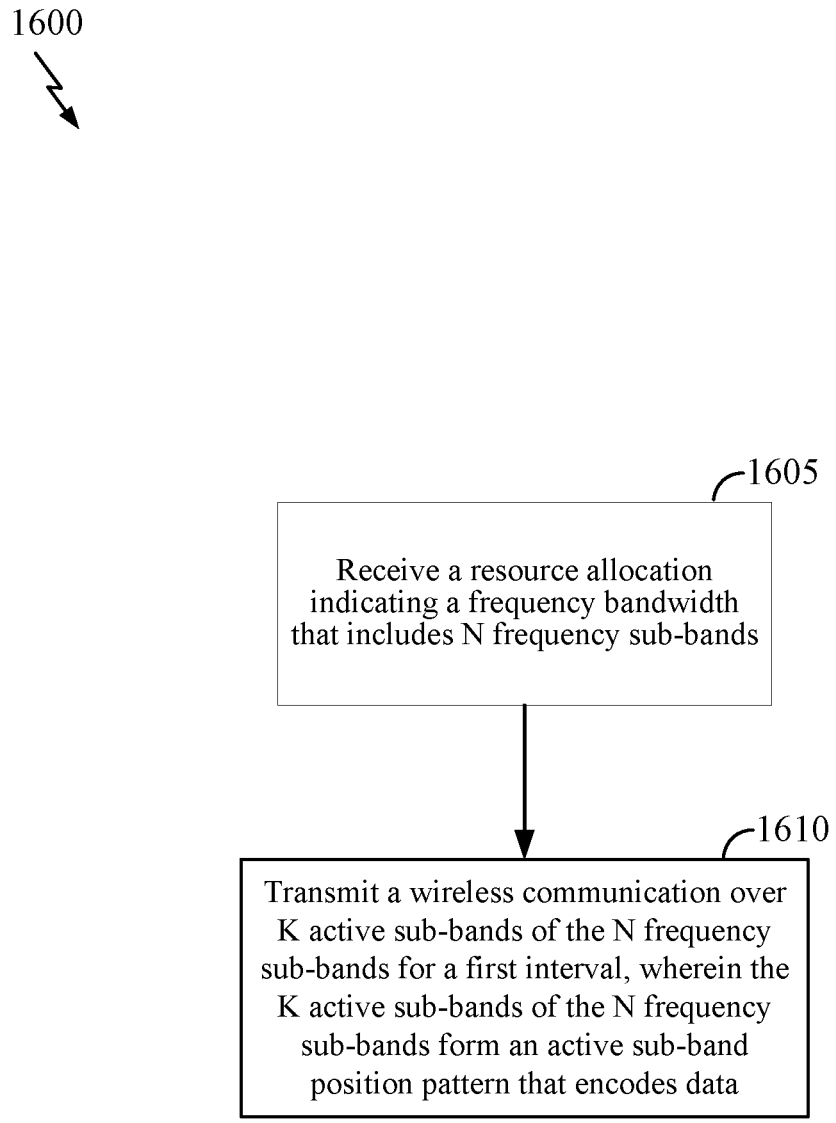
FIG. 16 is a flowchart of another example process for transmitting wireless communications including sub-band position modulation according to some aspects of the disclosure.

FIG. 16 is a flow chart illustrating an exemplary process 1600 for transmitting wireless communications including sub-band position modulation in accordance with some aspects of the present disclosure. As described below, a particular implementation may omit some or all illustrated features, and may not require some illustrated features to implement all embodiments. In some examples, the transmitting entity 1200 illustrated in FIG. 12 may be configured to carry out the process 1600. In some examples, any suitable apparatus or means for carrying out the functions or algorithm described below may carry out the process 1600.

At block 1605, the transmitting entity 1200 receives a resource allocation indicating a frequency bandwidth that includes N frequency sub-bands. For example, as described with respect to block 602 of FIG. 6 and 802 of FIG. 8, the transmitting entity 1200 (e.g., a UE) may receive a resource allocation from a receiving entity, such as the receiving entity 1300 (e.g., a base station or other scheduling entity), indicating the frequency bandwidth available for transmission. For example, the receiving entity 1300 may transmit a resource allocation over a wireless network indicating one or more resource block groups (see, e.g., resource block group (RBG) 380 of FIG. 3), which indicate a particular frequency bandwidth.

The indicated frequency bandwidth has N frequency sub-bands. In some examples, the resource allocation may indicate the N frequency sub-bands. In other examples, the resource allocation may not indicate the particular N frequency sub-bands. Rather, in some examples, the transmitting entity 1200 may determine the N frequency sub-bands from the indicated frequency bandwidth, as described with respect to block 604 of FIG. 6 and/or block 804 of FIG. 8. In some examples, the N frequency sub-bands may be consecutive and of uniform size, and N may be an integral value of 2 or more. The frequency bandwidth may be referred to as a wideband allocation when the frequency bandwidth includes multiple consecutive sub-bands over which data may be transmitted in parallel.

At block 1610, the transmitting entity 1200 transmits a wireless communication over K active sub-bands of the N frequency sub-bands for a first interval. The K active sub-bands of the N frequency sub-bands form an active sub-band position pattern that encodes data. The wireless communication may be, for example, a transmission cluster, as previously described (e.g., with respect to FIG. 14).

For example, the transmitting entity 1200 may determine data to be encoded. The data may include one or more of uplink traffic or uplink control. The transmitting entity 1200 may further determine the active sub-band position pattern that represents the data (e.g., an encoded version of the data), such as described with respect to block 606 of FIG. 6, block 808 of FIG. 8, and/or block 1408 of FIG. 14. The active sub-band position pattern includes a pattern of K active and (N–K) inactive sub-bands. The transmitting entity 1200 may then transmit, for the first interval, the wireless communication over the K active sub-bands of the N frequency sub-bands, such as described with respect to block 606 of FIG. 6, block 816 of FIG. 8, and/or block 1410 of FIG. 14. Accordingly, the data is encoded in the active sub-band pattern of the wireless communication. In other words, the pattern itself represents the data.

In some examples, the transmitting entity 1200 may transmit subsequent wireless communications in subsequent intervals in a similar manner to encode subsequent data in respective active sub-band patterns for each such subsequent wireless communication. For example, the transmitting entity 1200 may transmit a second wireless communication over a second set of K active sub-bands of the N frequency sub-bands for a second interval. The second set of K active sub-bands of the N frequency sub-bands may form a second active sub-band position pattern that encodes second data. The transmitting entity 1200 may similarly transmit a third wireless communication over a third set of K active sub-bands, a fourth wireless communication over a fourth set of K active sub-bands, and so on, to communicate subsequent data using further active sub-band patterns.

In some examples of block 1610, the wireless communication includes further data that is encoded into signals transmitted over the K active sub-bands. The further data may be similar to an $i^{th}$ portion of the first data set that is transmitted as described with respect to block 1410 of FIG. 14, the portion of data transmitted as described with respect to block 608 of FIG. 6, and/or the portion of data encoded and ultimately transmitted as described with respect to blocks 810-816 of FIG. 8. In some examples, the first interval has a duration of a plurality of orthogonal frequency divisional multiplexing (OFDM) symbols, and the further data is encoded into the plurality of OFDM symbols over the K active sub-bands. In some examples, K is greater than one and less than N. In some examples, the further data that is transmitted over the K active sub-bands using single carrier frequency division multiplexing (SC-FDM), and K is equal to one. Accordingly, the wireless communication may convey two pieces of data: (1) the data represented or encoded by the active sub-band pattern, and (2) the further data transmitted as signals in each of the K active sub-band. The data and the further data may be, for example, related control and traffic data (e.g., the further data may be uplink traffic and the data may be uplink control related to the uplink traffic, or vice versa), may be part of the same data traffic or control stream, or may be unrelated or independent data streams.

In some examples of block 1610, the wireless communication includes random signals or filler data (e.g., an encoded sine wave) that is transmitted over the K active sub-bands. Such data may be discarded or ignored by a receiving device. However, the receiving device may still decode data conveyed through the active sub-band position pattern of the wireless communication transmission.

In some examples, the transmitting entity 1200 may further transmit a demodulation reference signal, such as described with respect to FIG. 10.

In some examples, in the case of the transmitting entity 1200 being a base station, in block 1605, the transmitting entity 1200 may receive or determine the resource allocation (e.g., obtain from the memory 1205), rather than receive a resource allocation from another communication device (e.g., a UE). In such examples, the data transmitted in block 1610 may be downlink traffic and/or downlink control. Similarly, the further data transmitted via the K active sub-bands may be downlink traffic and/or downlink control. The data and the further data may be, for example, related control and traffic data, may be part of the same data traffic or control stream, or may be unrelated or independent data streams. Additionally, in some examples, the further data includes random signals or filler data (e.g., an encoded sine wave) that is transmitted over the K active sub-bands, which can be ignored or discarded by a receiving device.

Figure 17:
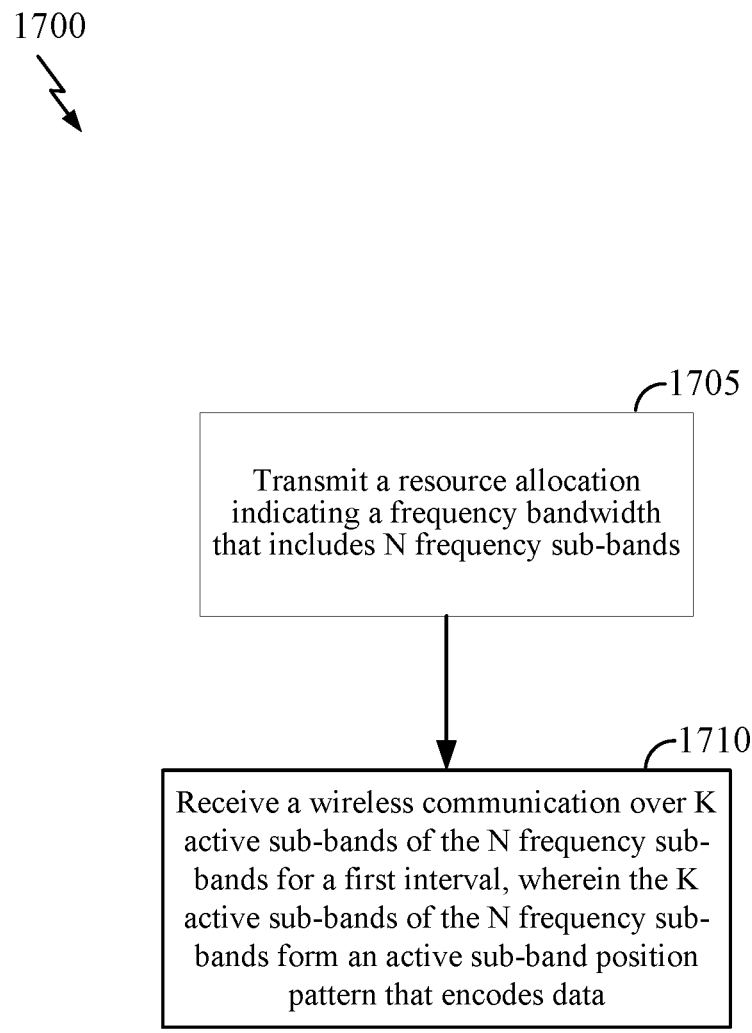
FIG. 17 is a flowchart of another example process for receiving wireless communications including sub-band position modulation according to some aspects of the disclosure.

FIG. 17 is a flow chart illustrating an exemplary process 1700 for receiving wireless communications including sub-band position modulation in accordance with some aspects of the present disclosure. As described below, a particular implementation may omit some or all illustrated features, and may not require some illustrated features to implement all embodiments. In some examples, the receiving entity 1300 illustrated in FIG. 13 may be configured to carry out the process 1700. In some examples, any suitable apparatus or means for carrying out the functions or algorithm described below may carry out the process 1700.

At block 1705, the receiving entity 1300 transmits a resource allocation indicating a frequency bandwidth that includes N frequency sub-bands. For example, as described with respect to block 602 of FIG. 6 and 802 of FIG. 8, the receiving entity 1300 (e.g., a base station) may transmit a resource allocation to a transmitting entity, such as the transmitting entity 1200 (e.g., a user equipment or other scheduled entity), indicating the frequency bandwidth available for transmission. For example, the receiving entity 1300 may transmit a resource allocation over a wireless network indicating one or more resource block groups (see, e.g., resource block group (RBG) 380 of FIG. 3), which indicate a particular frequency bandwidth.

The indicated frequency bandwidth has N frequency sub-bands. In some examples, the resource allocation may indicate the N frequency sub-bands. In other examples, the resource allocation may not indicate the particular N frequency sub-bands. Rather, in some examples, the transmitting entity 1200 may determine the N frequency sub-bands from the indicated frequency bandwidth, as described with respect to block 604 of FIG. 6 and/or block 804 of FIG. 8. In some examples, the N frequency sub-bands may be consecutive and of uniform size, and N may be an integral value of 2 or more. The frequency bandwidth may be referred to as a wideband allocation when the frequency bandwidth includes multiple consecutive sub-bands over which data may be transmitted in parallel.

At block 1710, the receiving entity 1300 receives a wireless communication over K active sub-bands of the N frequency sub-bands for a first interval. The K active sub-bands of the N frequency sub-bands form an active sub-band position pattern that encodes data. The wireless communication may be, for example, a transmission cluster, as previously described (e.g., with respect to FIG. 15). The data may include one or more of uplink traffic or uplink control.

The receiving entity 1300 may further determine the active sub-band position pattern from the wireless communication. For example, the receiving entity 1300 may perform an on/off detection for each sub-band of the N frequency sub-bands for a first symbol duration (or another duration or time period of the first interval) of the wireless communication, such as described above with respect to blocks 904-912 of FIG. 9 and/or blocks 1106-1140 of FIG. 11. For example, to perform the on/off detection, the receiving entity 1300 may sample the data transmission signal during the first symbol duration at each sub-band of the N sub-bands and measure an associated signal strength of the sample for each sub-band. The receiving entity 1300 may then compare the measured signal strength for each sub-band to a threshold (e.g., a noise threshold). For each sample having a measured signal strength above the threshold, the receiving entity 1300 may consider the associated sub-band as being an active sub-band. For each sample having a measured signal strength below the threshold, the receiving entity 1300 may consider the associated sub-band as being an inactive sub-band. The receiving entity 1300 may then determine the active sub-band position pattern to be the pattern of the active and inactive sub-bands of the N frequency sub-bands (e.g., ordered from lowest to highest sub-band, or from highest to lowest sub-band). Accordingly, the receiving entity 1300 may use "blind" detection to determine the active sub-band position pattern.

In some examples, the receiving entity 1300 may further decode the data from the active sub-band position pattern. In some examples, the receiving entity 1300 may decode, or determine, the data as described above with respect to block 932, block 1142 of FIG. 11, and/or block 1512 of FIG. 15. In some examples, the receiving entity 1300 may perform the inverse of the encoding action performed by a transmitting entity as described with respect to block 1408.

In some examples of the block 1710, the wireless communication includes further data that is encoded into signals transmitted over the K active sub-bands. In some examples, the first interval has a duration of a plurality of orthogonal frequency divisional multiplexing (OFDM) symbols, and the further data is encoded into the plurality of OFDM symbols over the K active sub-bands. In some examples, K is greater than one and less than N. In some examples, the further data that is transmitted over the K active sub-bands using single carrier frequency division multiplexing (SC-FDM), and K is equal to one.

In some examples, the receiving entity 1300 may decode the further data. For example, the further data may be similar to an $i^{th}$ portion of the first data set that is decoded as described with respect to block 1514 of FIG. 15, the data decoded as described with respect to blocks 940 and 942 of FIG. 9, and/or the data decoded as described with respect to block 1130 of FIG. 11.

In some examples of block 1710, the wireless communication includes random signals or filler data (e.g., an encoded sine wave) that is transmitted over the K active sub-bands. Such data may be discarded or ignored by the receiving entity 1300.

In some examples, the receiving entity 1300 may receive subsequent wireless communications in subsequent intervals in a similar manner to receive subsequent data encoded in respective active sub-band patterns for each such subsequent wireless communication. For example, the receiving entity 1300 may receive a second wireless communication over a second set of K active sub-bands of the N frequency sub-bands for a second interval. The second set of K active sub-bands of the N frequency sub-bands may form a second active sub-band position pattern that encodes second data. The receiving entity 1300 may similarly receive a third wireless communication over a third set of K active sub-bands, a fourth wireless communication over a fourth set of K active sub-bands, and so on, to receive subsequent data encoded using further active sub-band patterns.

In some examples, in the case of the receiving entity 1300 being a UE, in block 1705, the receiving entity 1300 may receive or determine the resource allocation (e.g., from a communication from a base station), rather than transmit a resource allocation to another communication device (e.g., a base station). In such examples, the data transmitted in block 1710 may be uplink traffic and/or uplink control. Similarly, the further data transmitted via the K active sub-bands may be uplink traffic and/or uplink control. The data and the further data may be, for example, related control and traffic data, may be part of the same data traffic or control stream, or may be unrelated or independent data streams. Additionally, in some examples, the further data includes random signals or filler data (e.g., an encoded sine wave) that is transmitted over the K active sub-bands, which can be ignored or discarded by a receiving device.

Further Examples Having A Variety of Features

Example 1: A method, apparatus, and non-transitory computer-readable medium for wireless communication at a transmitting device. The transmitting device determines a frequency bandwidth for transmission, the frequency bandwidth having N frequency sub-bands. The transmitting device further transmits, via the transceiver, a plurality of transmission clusters to transmit a first data set and a second data set. For each transmission cluster of the plurality of transmission clusters, the transmitting device selects K sub-bands as active sub-bands of the N frequency sub-bands, wherein the K active sub-bands are selected to encode a portion of the second data set as an active sub-band position pattern. For each transmission cluster, the transmitting device further transmits, via the transceiver, a portion of the first data set over the K active sub-bands, wherein the transmission over the K active sub-bands indicates the active sub-band position pattern.

Example 2: A method, apparatus, and non-transitory computer-readable medium of Example 1, wherein each transmission cluster has a cluster duration of a plurality of orthogonal frequency divisional multiplexing (OFDM) symbols, and, wherein, for each transmission cluster, the portion of the first data set is encoded into the plurality of frequency divisional multiplexing symbols over the K active sub-bands.

Example 3: A method, apparatus, and non-transitory computer-readable medium of any of Examples 1 to 2, wherein the transmitting device transmits the first data set using orthogonal frequency divisional multiplexing (OFDM).

Example 4: A method, apparatus, and non-transitory computer-readable medium of any of Examples 1 to 3, wherein K is greater than one and less than N.

Example 5: A method, apparatus, and non-transitory computer-readable medium of any of Examples 1 to 3, wherein the transmitting device transmits the first data set using single carrier frequency division multiplexing (SC-FDM), and wherein K is equal to one.

Example 6: A method, apparatus, and non-transitory computer-readable medium of any of Examples 1 to 5, wherein the transmitting device is a user equipment and the transmitting device determines the frequency bandwidth for transmission based on a communication from a base station.

Example 7: A method, apparatus, and non-transitory computer-readable medium of any of Examples 1 to 6, wherein, within at least a first transmission cluster of the plurality of transmission clusters, the transmitting device transmits a demodulation reference signal, wherein the demodulation reference signal is at least one selected from a group of: a wideband demodulation reference signal (DM-RS) transmitted over the N frequency sub-bands and a narrowband DM-RS transmitted over the K active sub-bands for the first transmission cluster.

Example 8: A method, apparatus, and non-transitory computer-readable medium for wireless communication at a receiving device. The receiving device determines a frequency bandwidth for receiving a transmission, the frequency bandwidth having N frequency sub-bands. The receiving device receives, via the transceiver, a plurality of transmission clusters for conveying a first data set and a second data set. For each transmission cluster of the plurality of transmission clusters, the receiving device receives, via the transceiver, a data transmission signal including K active sub-bands of the N frequency sub-bands, the K active sub-bands carrying a portion of the first data set; determines an active sub-band position pattern of the K active sub-bands of the N frequency sub-bands; determines a portion of the second data set based on the active sub-band position pattern; and decodes the portion of the first data set.

Example 9: A method, apparatus, and non-transitory computer-readable medium of Examples 8, wherein, to determine the active sub-band position pattern for a particular transmission cluster of the plurality of transmission clusters, the receiving device determines a signal strength of a signal of each sub-band of the N frequency sub-bands for the particular transmission cluster; and determines whether each of the sub-bands of the N frequency sub-bands for the particular transmission cluster is active based on a signal strength threshold and the respective signal strengths of each of the sub-bands.

Example 10: A method, apparatus, and non-transitory computer-readable medium of any of Examples 8 to 9, wherein, to determine whether each of the sub-bands of the N frequency sub-bands for the particular transmission cluster is active, the receiving device determines whether the respective signal strength of each of the sub-bands exceeds the signal strength threshold to generate a set of potential active sub-bands; performs an error check on data of the signal for each of the potential active sub-bands to determine whether each of the respective signals has valid data; and determines that the potential active sub-bands with respective signals determined to have valid data are the K active sub-bands.

Example 11: A method, apparatus, and non-transitory computer-readable medium of any of Examples 8 to 10, wherein each transmission cluster has a cluster duration of a plurality of orthogonal frequency divisional multiplexing (OFDM) symbols, and, wherein, for each transmission cluster, the portion of the first data set is encoded into the plurality of OFDM symbols over the K active sub-bands.

Example 12: A method, apparatus, and non-transitory computer-readable medium of any of Examples 8 to 11, wherein the plurality of transmission clusters conveys the first data set using orthogonal frequency divisional multiplexing (OFDM).

Example 13: A method, apparatus, and non-transitory computer-readable medium of any of Examples 8 to 12, wherein K is greater than one and less than N.

Example 14: A method, apparatus, and non-transitory computer-readable medium of any of Examples 8 to 12, wherein the plurality of transmission clusters convey the first data set using single carrier frequency division multiplexing (SC-FDM), and wherein K is equal to one.

Example 15: A method, apparatus, and non-transitory computer-readable medium of any of Examples 8 to 14, wherein the receiving device is a base station and the receiving device determines the frequency bandwidth for transmission and to transmit the frequency bandwidth for transmission to a user equipment (UE).

Example 16: A method, apparatus, and non-transitory computer-readable medium for wireless communication at a transmitting device. The transmitting device receives, via the transceiver, a resource allocation indicating a frequency bandwidth, the frequency bandwidth including N frequency sub-bands. The transmitting device further transmits, via the transceiver, a wireless communication over K active sub-bands of the N frequency sub-bands for a first interval. The K active sub-bands of the N frequency sub-bands form an active sub-band position pattern that encodes data.

Example 17: A method, apparatus, and non-transitory computer-readable medium of Example 16, wherein the transmitting device is further transmits, via the transceiver, a second wireless communication over a second set of K active sub-bands of the N frequency sub-bands for a second interval. The second set of K active sub-bands of the N frequency sub-bands form a second active sub-band position pattern that encodes second data.

Example 18: A method, apparatus, and non-transitory computer-readable medium of any of Examples 16 to 17, wherein the first interval has a duration of a plurality of orthogonal frequency divisional multiplexing (OFDM) symbols, and, wherein the wireless communication includes further data that is encoded into the plurality of OFDM symbols over the K active sub-bands.

Example 19: A method, apparatus, and non-transitory computer-readable medium of any of Examples 16 to 18, wherein K is greater than one and less than N.

Example 20: A method, apparatus, and non-transitory computer-readable medium of any of Examples 16 to 18, wherein the wireless communication includes further data that is transmitted over the K active sub-bands using single carrier frequency division multiplexing (SC-FDM), and wherein K is equal to one.

Example 21: A method, apparatus, and non-transitory computer-readable medium of any of Examples 16 to 20, wherein the transmitting device is a user equipment and the user equipment is configured to receive the resource allocation in a communication from a base station.

Example 22: A method, apparatus, and non-transitory computer-readable medium of any of Examples 16 to 21, wherein the transmitting device transmits a demodulation reference signal. The demodulation reference signal is one or more of: a wideband demodulation reference signal (DM-RS) transmitted over the N frequency sub-bands, and a narrowband DM-RS transmitted over the K active sub-bands.

Example 23: A method, apparatus, and non-transitory computer-readable medium for wireless communication at a receiving device. The receiving device transmits, via the transceiver, a resource allocation indicating a frequency bandwidth, the frequency bandwidth including N frequency sub-bands. The receiving device further receives, via the transceiver, a wireless communication over K active sub-bands of the N frequency sub-bands for a first interval. The K active sub-bands of the N frequency sub-bands form an active sub-band position pattern that encodes data.

Example 24: A method, apparatus, and non-transitory computer-readable medium of Examples 23, wherein the receiving device further decodes the data from the active sub-band position pattern.

Example 25: A method, apparatus, and non-transitory computer-readable medium of any of Examples 23 to 24, wherein the wireless communication includes further data that is transmitted over the K active sub-bands, and wherein the apparatus is further configured to decode the further data from the wireless communication.

Example 26: A method, apparatus, and non-transitory computer-readable medium of any of Examples 23 to 25, wherein the receiving device further receives, via the transceiver, a second wireless communication over a second set of K active sub-bands of the N frequency sub-bands for a second interval. The second set of K active sub-bands of the N frequency sub-bands form a second active sub-band position pattern that encodes second data.

Example 27: A method, apparatus, and non-transitory computer-readable medium of any of Examples 23 to 26, wherein the receiving device further determines the active sub-band position pattern based on a signal strength of a signal of each sub-band of the N frequency sub-bands for the first interval.

Example 28: A method, apparatus, and non-transitory computer-readable medium of Example 27, wherein, to determine the active sub-band position pattern based on the signal strength of the signal of each sub-band of the N frequency sub-bands, the receiving device further: determines whether the respective signal strength of each of the sub-bands exceeds a signal strength threshold to generate a set of potential active sub-bands; performs an error check on data of the signal for each of the potential active sub-bands to determine whether each of the respective signals has valid data; and determines that the potential active sub-bands with respective signals determined to have valid data are the K active sub-bands.

Example 29: A method, apparatus, and non-transitory computer-readable medium of any of Examples 23 to 28, wherein the first interval has a duration of a plurality of orthogonal frequency divisional multiplexing (OFDM) symbols, and, wherein the wireless communication includes further data that is encoded into the plurality of OFDM symbols over the K active sub-bands.

Example 30: A method, apparatus, and non-transitory computer-readable medium of any of Examples 23 to 29, wherein the wireless communication includes further data that is transmitted over the K active sub-bands using single carrier frequency division multiplexing (SC-FDM), and wherein K is equal to one.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" and "communicatively coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus for wireless communication, comprising:
   at least one processor;
   a transceiver communicatively coupled to the at least one processor; and
   at least one memory communicatively coupled to the at least one processor,
   wherein the apparatus is configured to:
      receive, via the transceiver, a resource allocation indicating a frequency bandwidth, the frequency bandwidth including N frequency sub-bands, wherein N is an integer number greater than one; and
      transmit, via the transceiver, a wireless communication of first data over K active sub-bands of the N frequency sub-bands for a first interval, wherein positions of the K active sub-bands in the N frequency sub-bands form a first active sub-band position pattern that encodes first additional bits of data relative to the wireless communication of the first data over the K active sub-bands, wherein K is an integer number of sub-bands greater than zero and less than N.

2. The apparatus of claim 1, wherein the apparatus is further configured to:
   transmit, via the transceiver, a second wireless communication of second data over a second set of K active sub-bands of the N frequency sub-bands for a second interval, wherein positions of the second set of K active sub-bands in the N frequency sub-bands form a second active sub-band position pattern that encodes second additional bits of data, wherein the second additional bits of data are different from the first additional bits of data.

3. The apparatus of claim 1, wherein the first interval has a duration of a plurality of orthogonal frequency divisional multiplexing (OFDM) symbols, and wherein the first data is encoded into the plurality of OFDM symbols over the K active sub-bands.

4. The apparatus of claim 1, wherein to transmit the wireless communication, the apparatus is configured to transmit the wireless communication of the first data over the K active sub-bands using single carrier frequency division multiplexing (SC-FDM), and wherein K is equal to one.

5. The apparatus of claim 1, wherein the apparatus is a user equipment and the user equipment is configured to receive the resource allocation in a communication from a base station.

6. The apparatus of claim 1, wherein, the apparatus is configured to transmit a demodulation reference signal, wherein the demodulation reference signal is one or more of:
   a wideband demodulation reference signal (DM-RS) transmitted over the N frequency sub-bands, and
   a narrowband DM-RS transmitted over the K active sub-bands.

7. A method of wireless communication, the method comprising:
   receiving a resource allocation indicating a frequency bandwidth, the frequency bandwidth including N frequency sub-bands, wherein N is an integer number greater than one; and
   transmitting a wireless communication of first data over K active sub-bands of the N frequency sub-bands for a first interval, wherein positions of the K active sub-bands in the N frequency sub-bands form a first active sub-band position pattern that encodes first additional bits of data relative to the wireless communication of the first data over the K active sub-bands, wherein K is an integer number of sub-bands greater than zero and less than N.

8. The method of claim 7, further comprising:
   transmitting a second wireless communication of second data over a second set of K active sub-bands of the N frequency sub-bands for a second interval, wherein positions of the second set of K active sub-bands in the N frequency sub-bands form a second active sub-band position pattern that encodes second additional bits of data, wherein the second additional bits of data are different from the first additional bits of data.

9. The method of claim 7, wherein the first interval has a duration of a plurality of orthogonal frequency divisional multiplexing (OFDM) symbols, and wherein the first data is encoded into the plurality of OFDM symbols over the K active sub-bands.

10. The method of claim 7, wherein transmitting the wireless communication comprises transmitting the wireless communication of the first data over the K active sub-bands using single carrier frequency division multiplexing (SC-FDM), and wherein K is equal to one.

11. The method of claim 7, wherein receiving the resource allocation of N frequency sub-bands comprises receiving, by a user equipment, the resource allocation of N frequency sub-bands in a communication from a base station that indicates the resource allocation, and wherein transmitting the wireless communication of the first data over the K active sub-bands comprises the user equipment transmitting the wireless communication of first data as an uplink transmission to the base station.

12. The method of claim 7, further comprising:
transmitting a demodulation reference signal, wherein transmitting the demodulation reference signal includes one or more of:
transmitting a wideband demodulation reference signal over the N frequency sub-bands, and
transmitting a narrowband demodulation reference signal over the K active sub-bands.

13. An apparatus for wireless communication, comprising:
at least one processor;
a transceiver communicatively coupled to the at least one processor; and
at least one memory communicatively coupled to the at least one processor,
wherein the apparatus is configured to:
transmit, via the transceiver, a resource allocation indicating a frequency bandwidth, the frequency bandwidth including N frequency sub-bands, wherein N is an integer number greater than one; and
receive, via the transceiver, a wireless communication of first data over K active sub-bands of the N frequency sub-bands for a first interval, wherein positions of the K active sub-bands in the N frequency sub-bands form a first active sub-band position pattern that encodes first additional bits of data relative to the wireless communication of the first data over the K active sub-bands, wherein K is an integer number of sub-bands greater than zero and less than N.

14. The apparatus of claim 13, wherein the apparatus is further configured to:
decode the first additional bits of data from the first active sub-band position pattern.

15. The apparatus of claim 13, wherein the apparatus is further configured to decode the first data from the wireless communication.

16. The apparatus of claim 13, wherein the apparatus is further configured to:
receive, via the transceiver, a second wireless communication of second data over a second set of K active sub-bands of the N frequency sub-bands for a second interval, wherein positions of the second set of K active sub-bands in the N frequency sub-bands form a second active sub-band position pattern that encodes second additional bits of data, wherein the second additional bits of data are different from the first additional bits of data.

17. The apparatus of claim 13, wherein the apparatus is further configured to:
determine the first active sub-band position pattern based on a signal strength of a signal of each sub-band of the N frequency sub-bands for the first interval.

18. The apparatus of claim 17, wherein, to determine the first active sub-band position pattern based on the signal strength of the signal of each sub-band of the N frequency sub-bands, the apparatus is further configured to:
determine whether the respective signal strength of each of the sub-bands exceeds a signal strength threshold to generate a set of potential active sub-bands,
perform an error check on the first data of the signal for each of the potential active sub-bands to determine whether each of the respective signals has valid data, and
determine that the potential active sub-bands with respective signals determine to have valid data are the K active sub-bands.

19. The apparatus of claim 13, wherein the first interval has a duration of a plurality of orthogonal frequency divisional multiplexing (OFDM) symbols, and wherein the first data is encoded into the plurality of OFDM symbols over the K active sub-bands.

20. The apparatus of claim 13, wherein to receive the wireless communication, the apparatus is configured to receive the wireless communication of the first data over the K active sub-bands using single carrier frequency division multiplexing (SC-FDM), and wherein K is equal to one.

21. A method of wireless communication, the method comprising:
transmitting a resource allocation indicating a frequency bandwidth, the frequency bandwidth including N frequency sub-bands, wherein N is an integer number greater than one; and
receiving a wireless communication of first data over K active sub-bands of the N frequency sub-bands for a first interval, wherein positions of the K active sub-bands in the N frequency sub-bands form a first active sub-band position pattern that encodes first additional bits of data relative to the wireless communication of the first data over the K active sub-bands, wherein K is an integer number of sub-bands greater than zero and less than N.

22. The method of claim 21, further comprising:
decoding the first additional bits of data from the first active sub-band position pattern.

23. The method of claim 21, the method further comprising:
decoding the first data from the wireless communication.

24. The method of claim 21, further comprising:
receiving a second wireless communication of second data over a second set of K active sub-bands of the N frequency sub-bands for a second interval, wherein positions of the second set of K active sub-bands in the N frequency sub-bands form a second active sub-band position pattern that encodes second additional bits of data, wherein the second additional bits of data are different from the first additional bits of data.

25. The method of claim 21, further comprising:
determining the first active sub-band position pattern based on a signal strength of a signal of each sub-band of the N frequency sub-bands for the first interval.

26. The method of claim 25, wherein determining the first active sub-band position pattern based on the signal strength of the signal of each sub-band of the N frequency sub-bands comprises:
determining whether the respective signal strength of each of the sub-bands exceeds a signal strength threshold to generate a set of potential active sub-bands,
performing an error check on the first data of the signal for each of the potential active sub-bands to determine whether each of the respective signals has valid data, and
determining that the potential active sub-bands with respective signals determined to have valid data are the K active sub-bands.

27. The method of claim 21, wherein the first interval has a duration of a plurality of orthogonal frequency divisional multiplexing (OFDM) symbols, and wherein the first data is encoded into the plurality of OFDM symbols over the K active sub-bands.

28. The method of claim 21, wherein the wireless communication comprises receiving the wireless communication of the first data over the K active sub-bands using single carrier frequency division multiplexing (SC-FDM), and wherein K is equal to one.

* * * * *